US012806636B2

(12) United States Patent
Aoyama et al.

(10) Patent No.: US 12,806,636 B2
(45) Date of Patent: Nov. 24, 2026

(54) MIST GENERATING NOZZLE

(71) Applicant: Science Co., Ltd., Osaka (JP)

(72) Inventors: Yasuaki Aoyama, Osaka (JP); Masateru Hirae, Osaka (JP); Takahiro Okumura, Osaka (JP); Yasuhiro Mizukam, Osaka (JP)

(73) Assignee: Science Co., Ltd., Osaka (JP)

( * ) Notice: Subject to any disclaimer, the term of this patent is extended or adjusted under 35 U.S.C. 154(b) by 108 days.

(21) Appl. No.: 19/037,835

(22) Filed: Jan. 27, 2025

(65) Prior Publication Data

US 2025/0235883 A1 Jul. 24, 2025

Related U.S. Application Data

(62) Division of application No. 18/686,989, filed as application No. PCT/JP2022/021542 on May 26, 2022, now abandoned.

(30) Foreign Application Priority Data

Jan. 11, 2022 (JP) ................................ 2022-002142

(51) Int. Cl.
*B05B 1/26* (2006.01)
*B05B 1/14* (2006.01)

(52) U.S. Cl.
CPC . *B05B 1/26* (2013.01); *B05B 1/14* (2013.01)

(58) Field of Classification Search
CPC .................................... B05B 1/26; B05B 1/14
(Continued)

(56) References Cited

U.S. PATENT DOCUMENTS 3,130,919 A * 4/1964 Baker .................. B05B 1/1823 239/533.13
3,342,419 A * 9/1967 Weese ..................... E03C 1/046 239/533.13
(Continued)

FOREIGN PATENT DOCUMENTS

JP 59086262 U1 6/1984
JP 835463 A 2/1996
(Continued)

OTHER PUBLICATIONS

International Search Report and Written Opinion filed in PCT/JP2022/021542, dated Jul. 26, 2022, 14 pages.
(Continued)

*Primary Examiner* — Chee-Chong Lee
(74) *Attorney, Agent, or Firm* — Vedder Price P.C.

(57) ABSTRACT

The present invention provides a mist generating nozzle capable of generating a large amount of mist (liquid droplets) in which a large amount of microbubbles and a large amount of ultrafine bubbles are mixed and dissolved by ejecting a liquid into outside air. The present invention includes a nozzle main body (Y1). The nozzle main body (2) includes first and second ejection ports (4, 5), first and second inflow ports (6, 7), a first nozzle hole (8) connected to the first ejection port (4) and the first inflow port (6), and a second nozzle hole (9) connected to the second ejection port (5) and the second inflow port (7). The nozzle main body (Y1) ejects water from the first and second ejection ports (4, 5) into outside air at first and second acute angles (θ1, θ2) to cause parts of the liquid ejected from the first and second ejection ports (4, 5) to collide with each other and turn the ejected water by the collision.

1 Claim, 22 Drawing Sheets

(58) Field of Classification Search
USPC .......................................................... 239/548
See application file for complete search history.

(56) References Cited

U.S. PATENT DOCUMENTS

| | | | | | |
|---|---|---|---|---|---|
| 3,697,002 | A * | 10/1972 | Parkison | E03C 1/08 239/533.14 |
| 3,719,328 | A * | 3/1973 | Hindman | B05B 1/185 239/461 |
| 4,228,956 | A * | 10/1980 | Varner | A01G 25/00 239/533.1 |
| 4,457,343 | A * | 7/1984 | Zukausky | G05D 7/012 239/533.14 |
| 4,492,339 | A * | 1/1985 | Kreitzberg | B05B 3/0455 239/230 |
| 5,080,286 | A | 1/1992 | Morrison | |
| 2004/0026528 | A1 | 2/2004 | Jenkins | |

FOREIGN PATENT DOCUMENTS

| | | | |
|---|---|---|---|
| JP | 200138257 | A | 2/2001 |
| JP | 2001-286790 | A | 10/2001 |
| JP | 2003-145064 | A | 5/2003 |
| JP | 2004-33821 | A | 2/2004 |
| JP | 2006-68660 | A | 3/2006 |
| JP | 2008-540106 | A | 11/2008 |

OTHER PUBLICATIONS

Notice of Reasons for Refusal filed in JP Application No. 2022-002142, dated Jul. 11, 2022; 7 pages.
European Search Report filed in Application No. 22920359.1 dated Dec. 18, 2024; 15 pgs.

* cited by examiner

X2

MIST GENERATING NOZZLE

CROSS REFERENCE TO RELATED APPLICATIONS

This application is a divisional application of U.S. application Ser. No. 18/686,989, filed on Feb. 27, 2024 and currently pending and entitled MIST GENERATING NOZZLE, which is a 371 of International Application No. PCT/JP2022/021542, filed on May 26, 2022, and claims the benefit of Japanese Application No. 2022-002142, filed on Jan. 11, 2022, the contents of each which are incorporated herein by reference in their entirety.

TECHNICAL FIELD

The present invention relates to a mist generating nozzle that generates mist (liquid droplets) in which a large amount of microbubbles and a large amount of ultrafine bubbles are mixed and dissolved by ejecting a liquid into outside air.

BACKGROUND ART

As a technology for generating mist, in Patent Literature 1, there is a disclosure of a two-fluid jet nozzle. The two-fluid jet nozzle includes an atomizing portion and a jet port, and introduces a pressurized cleaning liquid and a pressurized gas into the atomizing portion. In Patent Literature 1, the cleaning liquid and the gas are mixed in the atomizing portion to generate mist in which air bubbles are mixed and dissolved, and the mist is jetted from the jet port.

CITATION LIST

Patent Literature

[PTL 1] JP 2003-145064 A

SUMMARY OF INVENTION

Technical Problem

In Patent Literature 1, in order to generate mist in which air bubbles are mixed and dissolved, it is required to introduce the pressurized liquid into the atomizing portion.

In Patent Literature 1, mist in which a certain amount of microbubbles are mixed and dissolved can be generated by mixing the cleaning liquid (liquid) and the gas in the atomizing portion, to thereby pulverize (shear) the gas. However, it is desired that the amount of the microbubbles and ultrafine bubbles to be mixed and dissolved in the liquid be increased.

An object of the present invention is to provide a mist generating nozzle capable of generating a large amount of mist (liquid droplets) in which a large amount (large number) of microbubbles and a large amount (large number) of ultrafine bubbles are mixed and dissolved by ejecting a liquid into outside air.

Solution to Problem

According to an embodiment of the present invention, there is provided a mist generating nozzle, including a nozzle main body, which includes: a jet plate; a first ejection port opened to a front surface of the jet plate; a second ejection port opened to the front surface of the jet plate without communicating to the first ejection port; first and second inflow ports each opened to a back surface of the jet plate; a first nozzle hole connected to the first ejection port and the first inflow port; and a second nozzle hole connected to the second ejection port and the second inflow port, which is connected to a liquid flow path, and in which a liquid flowing through the liquid flow path flows into the first and second nozzle holes from the first and second inflow ports. The first and second ejection ports each having a port width in a first direction are opened to the front surface of the jet plate. The first and second ejection ports are arranged at a first hole interval of more than 0 and less than the port width between center lines of the first and second ejection ports in the first direction. The first and second ejection ports are arranged at a second hole interval between the center lines of the first and second ejection ports in a second direction perpendicular to the first direction. The first inflow port is arranged so that the first ejection port is located between the first inflow port and the second ejection port, and is opened to the back surface of the jet plate at a third hole interval from the first ejection port in the second direction. The second inflow port is arranged so that the second ejection port is located between the second inflow port and the first ejection port, and is opened to the back surface of the jet plate at a fourth hole interval from the second ejection port in the second direction. The first nozzle hole is connected to the first ejection port and the first inflow port at a first acute angle between a hole center line of the first nozzle hole and the center line of the first ejection port in the second direction. The second nozzle hole is connected to the second ejection port and the second inflow port at the first acute angle between a hole center line of the second nozzle hole and the center line of the second ejection port in the second direction. The first and second nozzle holes are arranged at a hole-to-hole angle of more than 0 and 90 degrees or less between the hole center line of the first nozzle hole and the hole center line of the second nozzle hole in the second direction. The first and second nozzle holes are arranged in parallel at the first hole interval between the hole center line of the first nozzle hole and the hole center line of the second nozzle hole in the first direction.

According to an embodiment of the present invention, the nozzle main body ejects the liquid having flowed into the first and second nozzle holes into outside air from the first and second ejection ports at the first and second acute angles. Parts of the liquid ejected from the first and second ejection ports at the first and second acute angles collide with each other. The liquid ejected from the first and second ejection ports at the first and second acute angles becomes a turning flow that is swirled due to the collision of the parts of the liquid. Air bubbles (gas/air) in the liquid ejected from the first and second ejection ports at the first and second acute angles are pulverized into a large amount (large number) of mist (liquid droplets) by the collision of the parts of the liquid and the turning flow. The liquid ejected from the first and second ejection ports at the first and second acute angles and the air bubbles (gas/air) in the liquid are pulverized (sheared) by the collision (splash) of the parts of the liquid and the turning flow to become a large amount of a mist liquid (liquid droplets) in which a large amount (large number) of microbubbles and a large amount (large number) of ultrafine bubbles are mixed and dissolved.

In an embodiment, a large amount of mist (liquid droplets) in which a large amount (large number) of microbubbles and a large amount (large number) of ultrafine bubbles are mixed and dissolved can be generated (produced) by ejecting the liquid into outside air from the first and second ejection ports without requiring the introduction of a pressurized gas.

In claim 1, it is also possible to adopt a configuration in which the nozzle main body ejects the liquid having flowed into the first nozzle hole from the first ejection port at the first acute angle and ejects the liquid having flowed into the second nozzle hole from the second ejection port at the second acute angle, and the first hole interval and the second hole interval are set to such intervals as to allow a part of the liquid ejected from the first ejection port at the first acute angle and a part of the liquid ejected from the second ejection port at the second acute angle to collide with each other.

According to an embodiment of the present invention, in the mist generating nozzle, the first acute angle and the second acute angle are set to the same angle.

Advantageous Effects of Invention

According to the present invention, a large amount (large number) of mist (liquid droplets) in which a large amount (large number) of microbubbles and a large amount (large number) of ultrafine bubbles are mixed and dissolved can be generated (produced) by ejecting the liquid into outside air from the first and second ejection ports.

DESCRIPTION OF EMBODIMENTS

Figure 1:
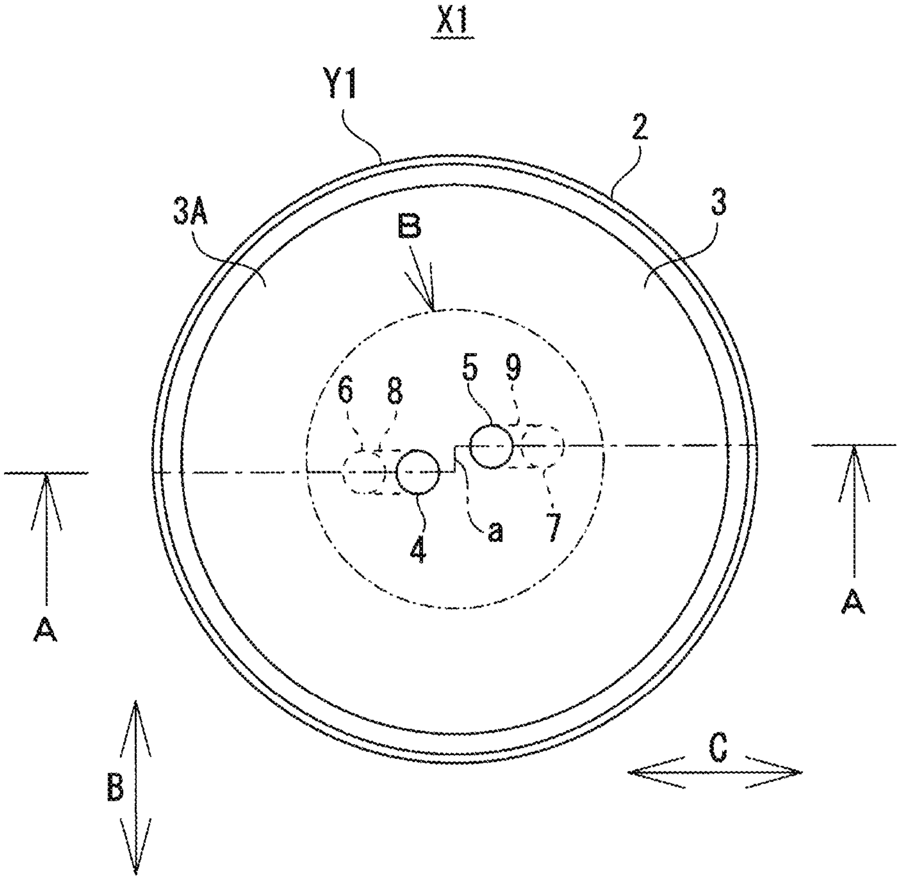
FIG. 1 is a top plan view (front surface view) for illustrating a mist generating nozzle according to a first embodiment.

A mist generating nozzle according to the present invention is described with reference to FIG. 1 to FIG. 29.

Mist generating nozzles according to a first embodiment and a second embodiment are described with reference to FIG. 1 to FIG. 29.

The mist generating nozzle (mist generating nozzle device/mist generator) according to the first embodiment is described with reference to FIG. 1 to FIG. 7.

In FIG. 1 to FIG. 7, a mist generating nozzle X1 according to the first embodiment (hereinafter referred to as "mist generating nozzle X1") includes a nozzle main body Y1.

As illustrated in FIG. 1 to FIG. 7, the nozzle main body Y1 (nozzle means) includes a nozzle tubular portion 2, a jet plate 3 (ejection plate/nozzle plate), a first ejection port 4, a second ejection port 5, a first inflow port 6, a second inflow port 7, a first nozzle hole 8, and a second nozzle hole 9.

Figure 2:
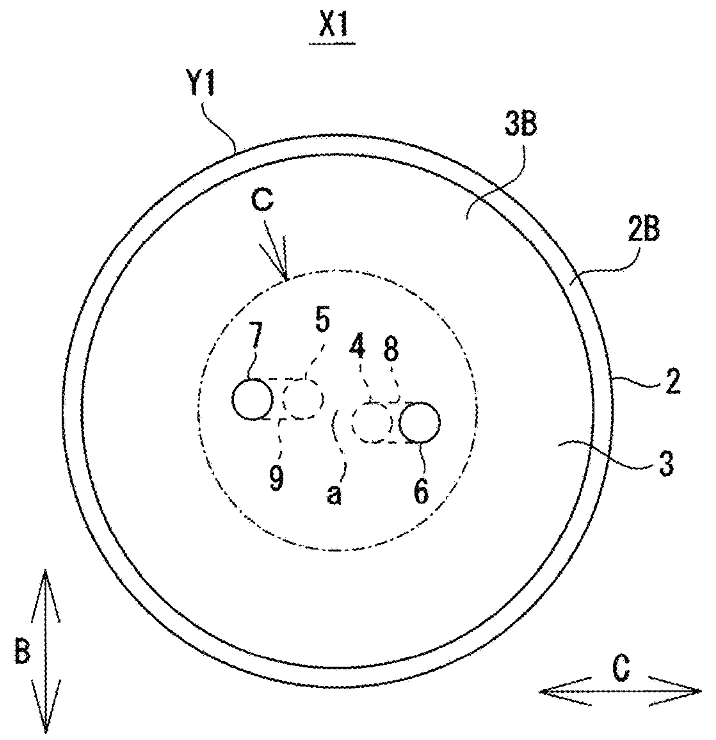
FIG. 2 is a bottom plan view (back surface view) for illustrating the mist generating nozzle according to the first embodiment.
Figure 3:
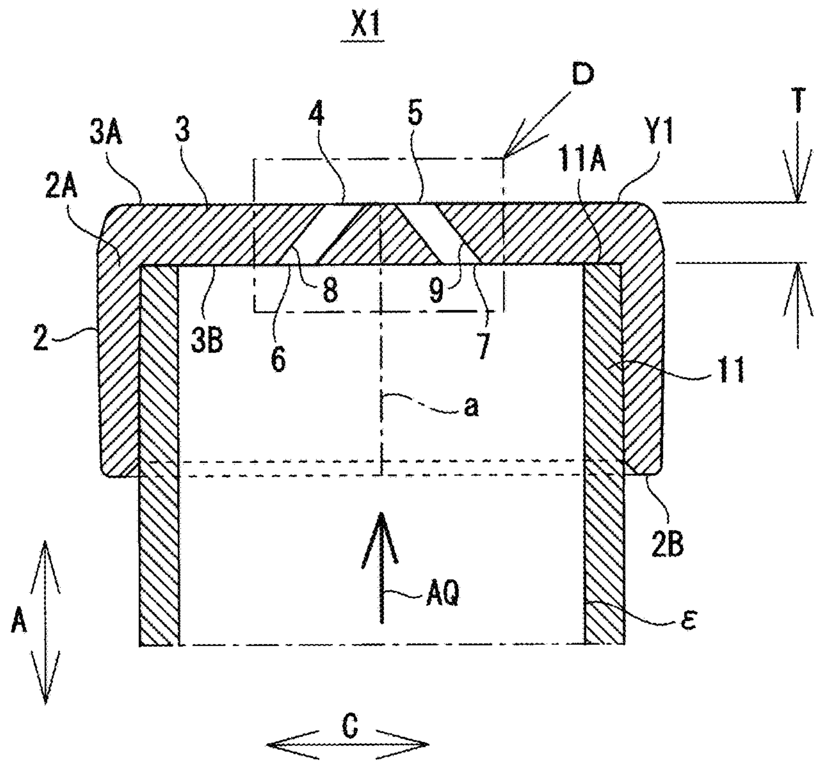
FIG. 3 is a sectional view taken along the line A-A of FIG. 1.

As illustrated in FIG. 2 and FIG. 3, the nozzle tubular portion 2 is formed in, for example, a cylindrical shape (cylindrical body).

As illustrated in FIG. 1 to FIG. 3, the jet plate 3 is formed in, for example, a circular shape (circular plate). The jet plate 3 has a front surface 3A (plate front surface) and a back surface 3B (plate back surface) in a plate thickness direction A (direction of a plate center line). The front surface 3A and the back surface 3B of the jet plate 3 are arranged in parallel with a plate thickness T in the plate thickness direction A.

The jet plate 3 closes one tube end 2A of the nozzle tubular portion 2, and is fixed to the nozzle tubular portion 2. The jet plate 3 is arranged concentrically with the nozzle tubular portion 2. The jet plate 3 closes the one tube end 2A of the nozzle tubular portion 2 so that the back surface 3B of the jet plate 3 is brought into abutment against the one tube end 2A of the nozzle tubular portion 2.

The jet plate 3 and the nozzle tubular portion 2 are integrally formed, for example, with a synthetic resin.

Figure 4:
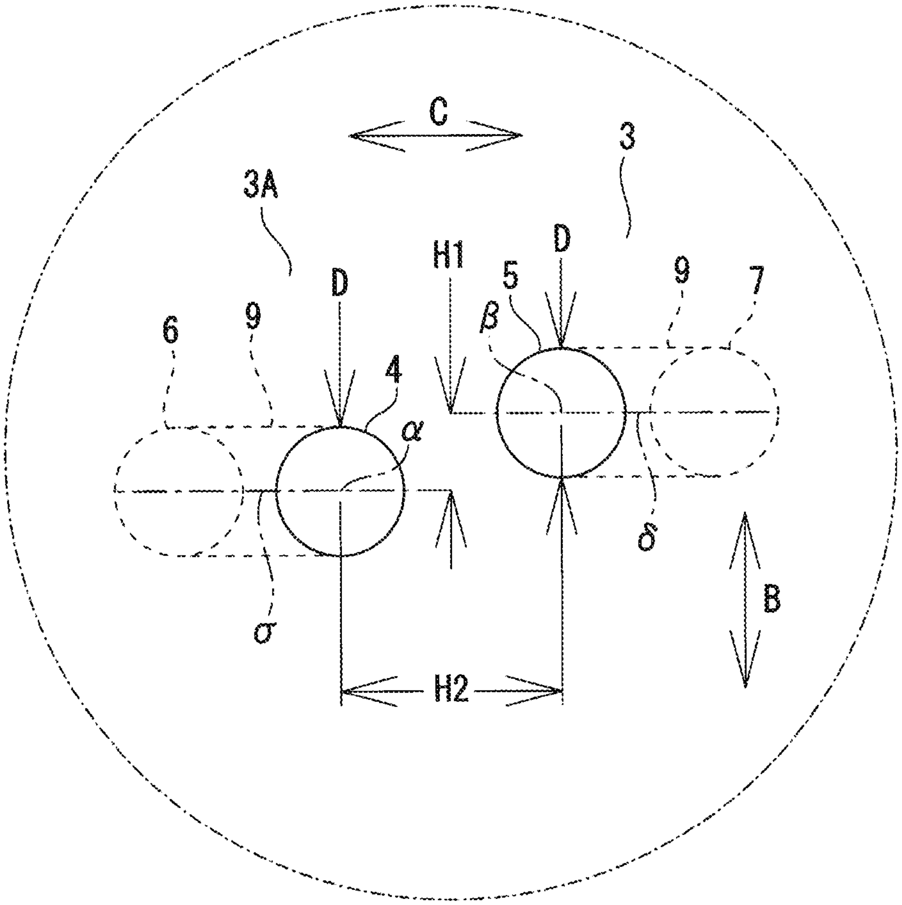
FIG. 4 is an enlarged view of a B-portion of FIG. 1.
Figure 5:
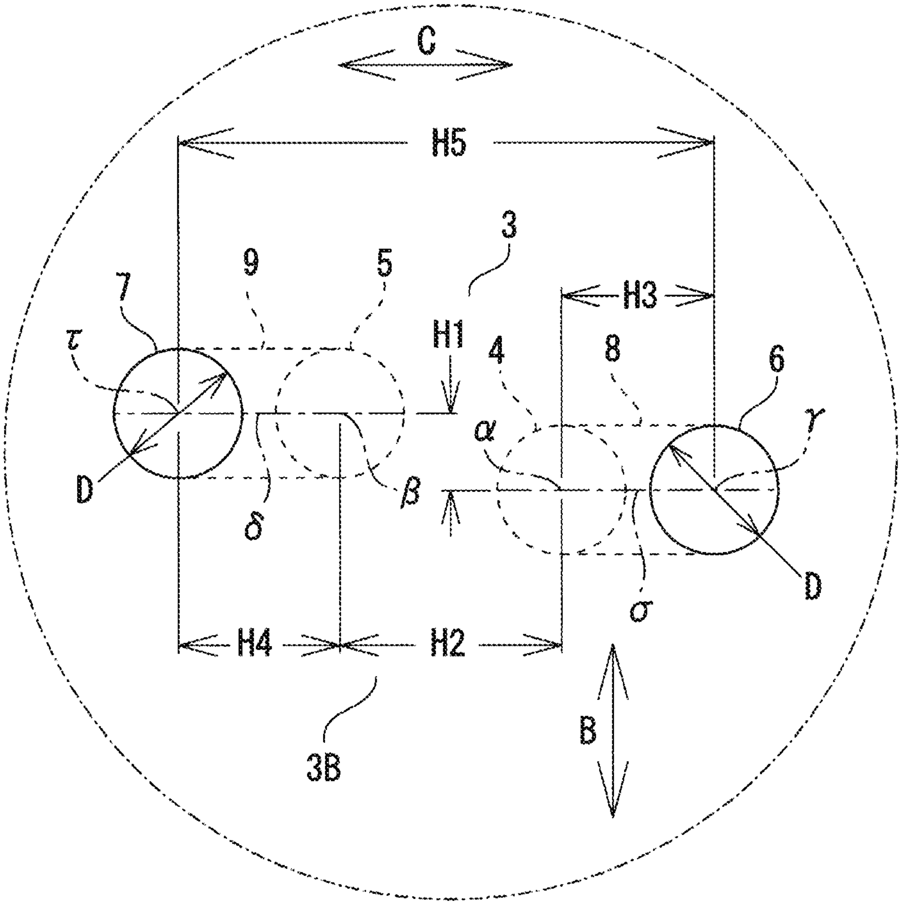
FIG. 5 is an enlarged view of a C-portion of FIG. 2.
Figure 6:
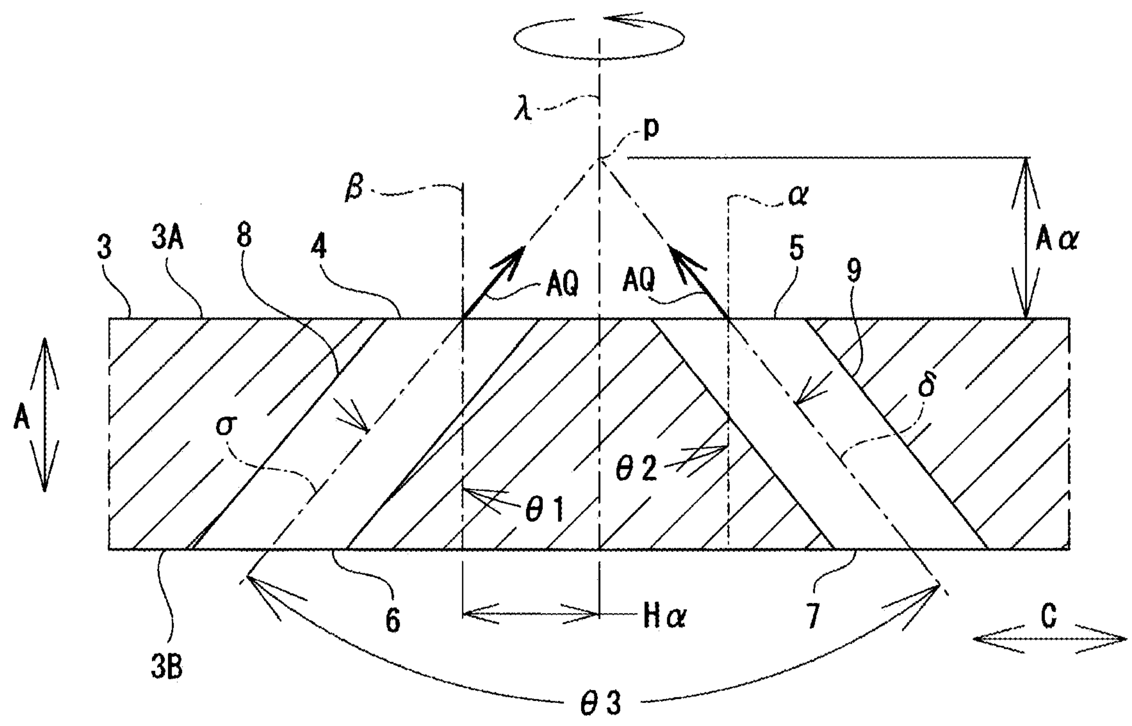
FIG. 6 is an enlarged view of a D-portion of FIG. 3.

As illustrated in FIG. 1 to FIG. 4 and FIG. 6, the first ejection port 4 and the second ejection port 5 (first and second ejection hole ports) are formed on the jet plate 3. The first ejection port 4 and the second ejection port 5 are opened to the front surface 3A of the jet plate 3. The first ejection port 4 and the second ejection port 5 are opened to the front surface 3A of the jet plate 3 without communicating to each other. As illustrated in FIG. 1, FIG. 4, and FIG. 6, the second ejection port 5 is opened to the front surface 3A of the jet plate 3 without communicating to the first ejection port 4.

As illustrated in FIG. 4, the first ejection port 4 and the second ejection port 5 are arranged at a first hole interval H1 between a center line "α" (hole port center line) of the first ejection port 4 and a center line "β" (hole port center line) of the second ejection port 5 in a first direction B (up-and-down direction) perpendicular to the plate thickness direction A of the jet plate 3 (direction of a tube center line "a" of the nozzle tubular portion 2/direction of a plate center line "a" of the jet plate 3).

The first ejection port 4 is arranged at the first hole interval H1 from the second ejection port 5 in the first direction B, and is opened to the front surface 3A of the jet plate 3. The second ejection port 5 is arranged at the first hole interval H1 from the first ejection port 4 in the first direction B, and is opened to the front surface 3A of the jet plate 3.

The first ejection port 4 and the second ejection port 5 are formed in, for example, a circular shape (circular port/circular hole port). The first ejection port 4 is formed in, for example, the same circular shape, which is a circular shape (circular port/circular hole port) having a diameter D, and is opened to the front surface 3A of the jet plate 3 with a port width D in the first direction B.

The first hole interval H1 (first hole distance) is an interval of more than 0 and less than the hole width D (diameter D).

With this configuration, the first ejection port 4 and the second ejection port 5 are opened to the front surface 3A of the jet plate 3 so that a part of the first ejection port 4 and a part of the second ejection port 5 overlap each other (match each other) in the first direction B.

As illustrated in FIG. 1 to FIG. 5, the first ejection port 4 and the second ejection port 5 are arranged at a second hole interval H2 between the center line "α" of the first ejection port 4 and the center line "β" of the second ejection port 5 in a second direction C (right-and-left direction) perpendicular to the plate thickness direction A of the jet plate 3 and the first direction B. The plate thickness direction A is a direction perpendicular to the first and second directions B and C.

The first ejection port 4 is arranged at the second hole interval H2 from the second ejection port 5 in the second direction C, and is opened to the front surface 3A of the jet plate 3. The second ejection port 5 is arranged at the second hole interval H2 from the first ejection port 4 in the second direction C, and is opened to the front surface 3A of the jet plate 3.

The second hole interval H2 (second hole distance) is an interval of, for example, several millimeters.

As illustrated in FIG. 2, FIG. 3, FIG. 5, and FIG. 6, the first inflow port 6 and the second inflow port 7 (first and second inflow hole ports) are formed on the jet plate 3. The first inflow port 6 and the second inflow port 7 are opened to the back surface 3B of the jet plate 3. The first inflow port 6 and the second inflow port 7 are formed in, for example, a circular shape (circular port). The first inflow port 6 and the second inflow port 7 are formed in the same circular shape as those of the first and second ejection ports 4 and 5, which is the circular shape (circular port/circular hole port) having the diameter D.

The first and second inflow ports 6 and 7 are arranged at the first hole interval H1 (first hole interval between the center lines "α" and "β" of the first and second ejection ports 4 and 5) between a center line "γ" (hole port center line) of the first inflow port 6 and a center line "τ" (hole port center line) of the second inflow port 7 in the first direction B.

The first inflow port 6 is arranged so that the first ejection port 4 is located between the first inflow port 6 and the second ejection port 5. The first inflow port 6 is opened to the back surface 3B of the jet plate 3 at a third hole interval H3 between the center line "γ" of the first inflow port 6 and the center line "α" of the first ejection port 4 in the second direction C. The first inflow port 6 is opened to the back surface 3B of the jet plate 3 at the third hole interval H3 from the first ejection port 4 in the second direction C.

The second inflow port 7 is arranged so that the second ejection port 5 is located between the second inflow port 7 and the first ejection port 4. The second inflow port 7 is opened to the back surface 3B of the jet plate 3 at a fourth hole interval H4 between the center line "τ" of the second inflow port 7 and the center line "β" of the second ejection port 5 in the second direction C. The second inflow port 7 is opened to the back surface 3B of the jet plate 3 at the fourth hole interval H4 from the second ejection port 5 in the second direction C.

The first inflow port 6 and the second inflow port 7 are arranged at a fifth hole interval H5 larger (wider) than the second hole interval H2 in the second direction C.

As illustrated in FIG. 1 to FIG. 6, the first nozzle hole 8 is formed in the jet plate 3. The first nozzle hole 8 is formed so as to be connected to the first ejection port 4 and the first inflow port 6 and to penetrate through the jet plate 3 in the plate thickness direction A. The first nozzle hole 8 extends between the first ejection port 4 and the first inflow port 6 at a first acute angle θ1 between a hole center line "σ" of the first nozzle hole 8 and the center line "α" of the first ejection port 4 in the second direction C, and is connected to the first ejection port 4 and the first inflow port 6.

The first nozzle hole 8 extends from the first ejection port 4 (front surface 3A of the jet plate 3) to the back surface 3B (first inflow port 6) of the jet plate 3 while being separated from the first and second ejection ports 4 and 5 at the first acute angle θ1 between the hole center line "σ" of the first nozzle hole 8 and the center line "α" of the first ejection port 4 in the second direction C, and is connected to the first inflow port 6. The first acute angle θ1 is $\theta 1 = \tan^{-1}(H3/T) = \tan^{-1}$ (third hole interval/plate thickness).

As illustrated in FIG. 1 to FIG. 6, the second nozzle hole 9 is formed in the jet plate 3. The second nozzle hole 9 is formed so as to be connected to the second ejection port 5 and the second inflow port 7 and to penetrate through the jet plate 3 in the plate thickness direction A. The second nozzle hole 9 extends between the second ejection port 5 and the second inflow port 7 at a second acute angle θ2 between a hole center line "δ" of the second nozzle hole 9 and the center line "β" of the second ejection port 5 in the second direction C, and is connected to the second ejection port 5 and the second inflow port 7.

The second nozzle hole 9 extends from the second ejection port 5 (front surface 3A of the jet plate 3) to the back surface 3B (first inflow port 6) of the jet plate 3 while being separated from the first and second ejection ports 4 and 5 at the second acute angle θ2 between the hole center line "δ" of the second nozzle hole 9 and the center line "β" of the second ejection port 5 in the second direction C, and is connected to the second inflow port 7. The second acute angle θ2 is θ2=$\tan^{-1}$ (H4/T)=$\tan^{-1}$ (fourth hole interval/plate thickness).

As illustrated in FIG. 6, the first nozzle hole 8 and the second nozzle hole 9 are arranged at a hole-to-hole angle θ3 between the hole center line "σ" of the first nozzle hole 8 and the hole center line "δ" of the second nozzle hole 9 in the second direction C.

The hole-to-hole angle θ3 is an angle of more than 0 degrees (0°) and 90 degrees (90°) or less. The first acute angle θ1 of the first nozzle hole 8 and the second acute angle θ2 of the second nozzle hole 9 are set to different angles or the same angle.

When the hole-to-hole angle θ3 is set to 90 degrees (90°) (θ3=90°), for example, the first acute angle θ1 is set to 30 degrees (θ1=30°) and the second acute angle θ2 is set to 60 degrees (θ2=60°), or the first and second acute angles θ1 and θ2 are set to the same angle of 45 degrees (θ1=θ2=45°).

When the hole angle θ3 is set to 60 degrees (60°) (θ3=60°), for example, the first acute angle θ1 is set to 15 degrees (θ1=15°) and the second acute angle θ2 is set to 45 degrees (θ2=45°), or the first and second acute angles θ1 and θ2 are set to the same angle of 30 degrees (θ1=θ2=30°).

The first nozzle hole 8 and the second nozzle hole 9 are arranged in parallel at the first hole interval H1 between the hole center line "σ" of the first nozzle hole 8 and the hole center line "δ" of the second nozzle hole 9 (same interval as that between the first and second ejection ports 4 and 5) in the first direction B.

In the mist generating nozzle X1, the nozzle main body Y1 is connected to a liquid flow path pipe 11 (liquid flow path "ε") as illustrated in FIG. 3. The liquid flow path pipe 11 is mounted to the nozzle main body Y1 by press-fitting (inserting) one pipe end 11A side of the liquid flow path pipe 11 into the nozzle tubular portion 2 from another tube end 2B of the nozzle tubular portion 2. As illustrated in FIG. 3, the liquid flow path pipe 11 is connected to the first and second inflow ports 6 and 7 by bringing the one pipe end 11A of the liquid flow path pipe 11 into close contact with (causing the one pipe end 11A of the liquid flow path pipe 11 to tightly fit to) the back surface 3B of the jet plate 3 in the nozzle tubular portion 2. As illustrated in FIG. 3, the liquid flow path pipe 11 includes the liquid flow path "ε". The liquid flow path "ε" is formed inside the liquid flow path pipe 11. The liquid flow path "ε" penetrates through the liquid flow path pipe 11 in a direction of a pipe center line of the liquid flow path pipe 11, and is opened to the one pipe end 11A of the liquid flow path pipe 11. The liquid inflow path "ε" communicates to the first and second inflow ports 6 and 7 through the one pipe end 11A of the liquid flow path pipe 11.

The liquid flow path "ε" (liquid flow path pipe 11) is connected to a liquid supply source (not shown), and a liquid is introduced (supplied) thereto from the liquid supply source. The liquid supply source is, for example, a water supply source that supplies water AQ to the liquid flow path "ε" (liquid flow path pipe 11). The water AQ (liquid) supplied (introduced) from the water supply source (not shown) flows inside the liquid flow path pipe 11 (liquid flow path "ε"), and flows into the first and second nozzle holes 8 and 9 from the first and second inflow ports 6 and 7.

In the mist generating nozzle X1, as illustrated in FIG. 3, the water AQ (liquid) flowing inside the liquid flow path "ε" (liquid flow path pipe 11) flows into the first and second nozzle holes 8 and 9 from the first and second inflow ports 6 and 8 in the nozzle main body Y1.

Figure 7:
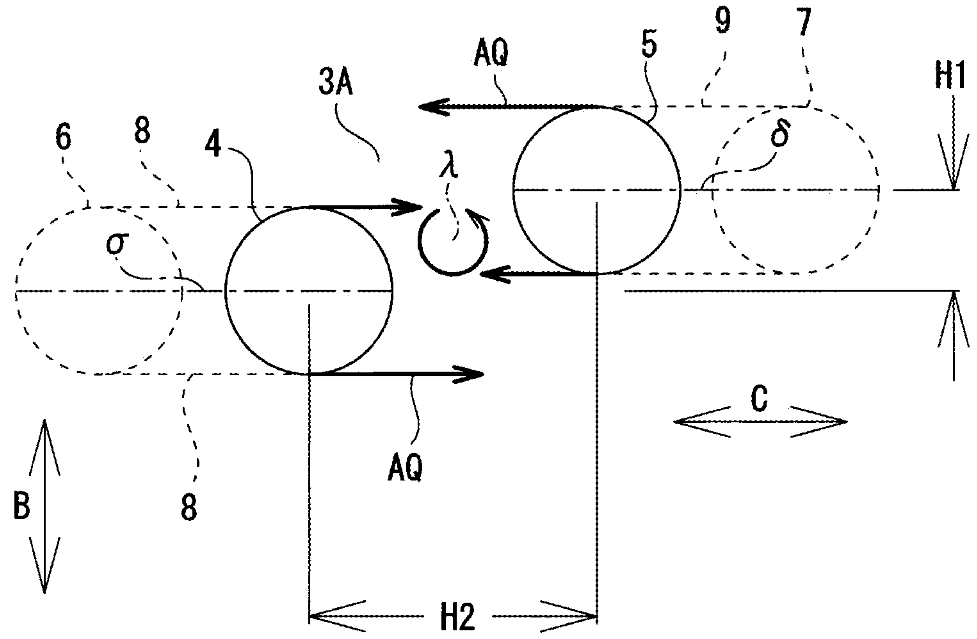
FIG. 7 is a view for illustrating a state of water (liquid) ejected from each of first and second ejection ports in the mist generating nozzle according to the first embodiment.
Figure 8:
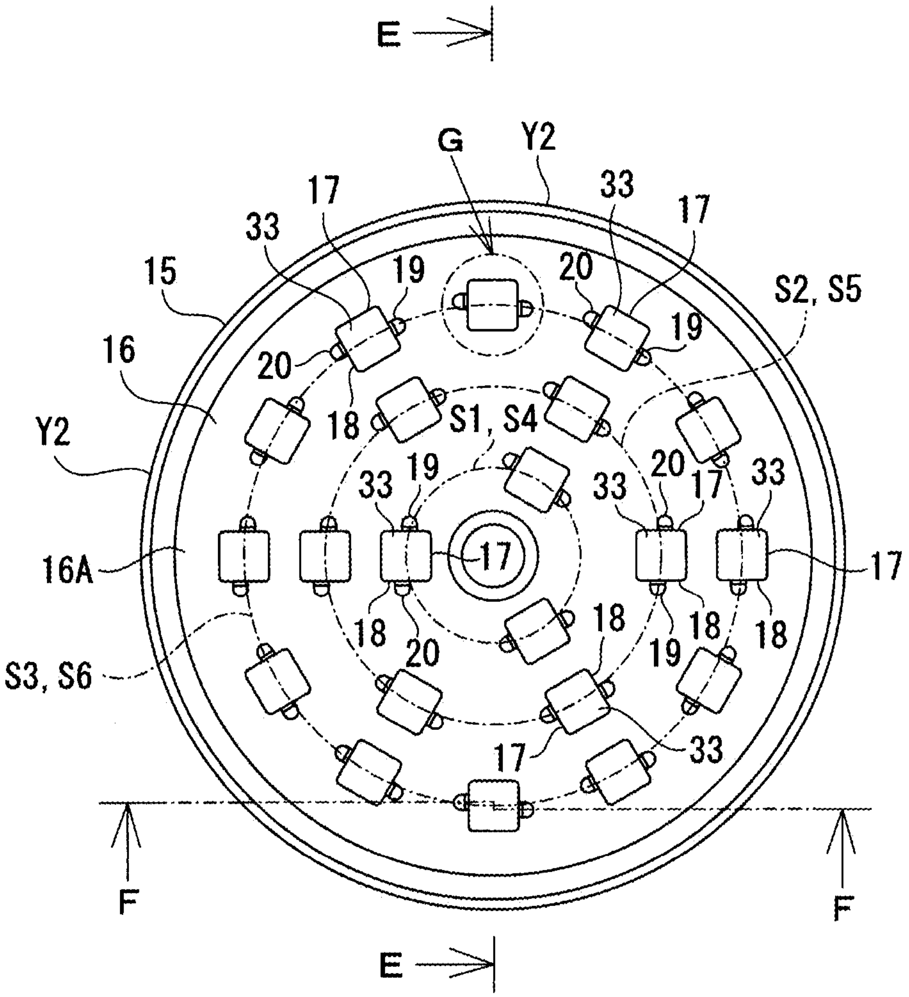
FIG. 8 is a top plan view (front surface view) for illustrating a mist generating nozzle according to a second embodiment.

In the mist generating nozzle X1, as illustrated in FIG. 6 and FIG. 7, the nozzle main body Y1 ejects the water AQ (liquid) having flowed into the first nozzle hole 8 into outside air from the first ejection port 4 at the first acute angle θ1. The nozzle main body Y1 ejects the water AQ (liquid) having flowed into the second nozzle hole 9 into outside air from the second ejection port 5 at the second acute angle θ2.

As illustrated in FIG. 6 and FIG. 7, the first nozzle hole 8 ejects the water AQ (liquid) having flowed into the first nozzle hole 8 to the second ejection port 5 side from the first ejection port 4 at the first acute angle θ1. The first nozzle hole 8 ejects the water AQ (liquid) toward the second ejection port 5 in the second direction C from the first ejection port 4 at the first acute angle θ1 (first acute angle with respect to the center line "α" of the first ejection port 4). The water AQ (liquid) having flowed into the first nozzle hole 8 flows inside the first nozzle hole 8 inclined at the first acute angle θ1 with respect to the center line "α" of the first ejection port 4 to be ejected to the second ejection port 5 side from the first ejection port 4 at the first acute angle θ1.

As illustrated in FIG. 6 and FIG. 7, the second nozzle hole 9 ejects the water AQ (liquid) having flowed into the second nozzle hole 9 into the first ejection port 4 side from the second ejection port 5 at the second acute angle θ2. The second nozzle hole 9 ejects the water AQ (liquid) toward the first ejection port 4 in the second direction C from the second ejection port 5 at the second acute angle θ2 (second acute angle with respect to the center line "β" of the second ejection port 5). The water AQ (liquid) having flowed into the second nozzle hole 9 flows inside the second nozzle hole 9 inclined at the second acute angle θ2 with respect to the center line "β" of the second ejection port 5 to be ejected to the first ejection port 4 side from the second ejection port 5 at the second acute angle θ2.

As illustrated in FIG. 6 and FIG. 7, the water AQ (liquid) ejected from the first ejection port 4 at the first acute angle θ1 and the water AQ (liquid) ejected from the second ejection port 5 at the second acute angle θ2 intersect with each other at an intersection point "p" between the first and second ejection ports 4 and 5, which is separated from the front surface 3A of the jet plate 3 at an ejection height Aα (ejection height interval) in the plate thickness direction A (direction perpendicular to the first and second directions B and C), and which is separated from the first ejection port 4 at an ejection interval Hα in the second direction C. Parts of the water AQ (liquid) ejected from the first and second ejection ports 4 and 5 at the first and second acute angles θ1 and θ2 collide with each other at the intersection point "p".

The water AQ (liquid) in a portion in which the first and second ejection ports 4 and 5 overlap each other (portion in which the first and second ejection ports 4 and 5 match each other) in the first direction B, which is the water AQ (liquid) ejected from the first and second ejection ports 4 and 5 at the first and second acute angles θ1 and θ2, is caused to collide at the intersection point "p".

The ejection height Aα (ejection height interval) is represented by the formula (1), and the ejection interval Hα is represented by the formula (2). In the formula (1) and the formula (2), H1 represents the first hole interval, θ1 represents the first acute angle, and θ2 represents the second acute angle.

$$A\alpha = \frac{H1 \times \tan\theta 1 \times \tan\theta 2}{\tan\theta 1 \times \tan\theta 2} \qquad (1)$$

-continued $$H\alpha = \frac{H1 \times \tan\theta 2}{\tan\theta 1 \times \tan\theta 2} \quad (2)$$

As illustrated in FIG. 6 and FIG. 7, the water AQ (liquid) ejected from the first and second ejection ports 4 and 5 at the first and second acute angles θ1 and θ2 is turned to be swirled around a turning center line "λ" (turning center) extending in the plate thickness direction A through the intersection point "p" at a center between the first and second ejection ports 4 and 5 in the second direction C (center of the second hole interval H2) by the collision of the parts of the water AQ (parts of the liquid).

The water AQ (liquid) ejected from the first and second ejection ports 4 and 5 at the first and second acute angles θ1 and θ2 obtains a turning force around the turning center line "λ" due to the collision of the parts of the water AQ (parts of the liquid), to thereby become a turning flow that is swirled around the turning center line "λ" by the turning force.

The water AQ (liquid) ejected from the first and second ejection ports 4 and 5 at the first and second acute angles θ1 and θ2 is pulverized (sheared) by the collision of the parts of the water AQ (parts of the liquid) to become a large amount (large number) of mist (liquid droplets).

The water AQ (liquid) ejected from the first and second ejection ports 4 and 5 at the first and second acute angles θ1 and θ2 and air bubbles (air/gas) in the water AQ (in the liquid) are pulverized (sheared) by the collision (splash) of the parts of the water AQ (parts of the liquid) and the turning (turning flow), to thereby become a large amount (large number) of mist water (water droplets/liquid droplets) in which a large amount (large number) of microbubbles and a large amount (large number) of ultrafine bubbles are mixed and dissolved.

The water AQ (liquid) ejected from the first and second ejection ports 4 and 5 at the first and second acute angles θ1 and θ2 is turned while sucking (mixing) air (outside air) into the mist water (water droplets/liquid droplets) by the turning (turning flow). The mist water (liquid droplets) and the air bubbles (containing air sucked in the mist water by the turning flow) in the mist water (water droplets/liquid droplets) are pulverized (sheared) by the turning flow (turning), to thereby become a large amount (large number) of mist water (water droplets/liquid droplets) in which a large amount (large number) of microbubbles and a large amount (large number) of ultrafine bubbles are mixed and dissolved.

In the mist generating nozzle X1, the first and second ejection ports 4 and 5 are opened to the front surface 3A of the jet plate 3 without communicating to each other, the first and second hole intervals H1 and H2 are set to such intervals as to allow the parts of the water AQ (liquid) ejected from the first and second ejection ports 4 and 5 at the first and second acute angles θ1 and θ2 to collide with each other, and the first and second nozzle holes are inclined at the first and second acute angles θ1 and θ2. With this configuration, the parts of the water AQ (liquid) ejected from the first and second ejection ports 4 and 5 are caused to collide (splash), and the water AQ (liquid) ejected from the first and second ejection ports 4 and 5 can be turned. As a result, a large amount (large number) of mist water (water droplets/liquid droplets) in which a large amount (large number) of microbubbles and a large amount (large number) of ultrafine bubbles are mixed and dissolved can be generated (produced) by the collision of the water AQ (liquid) and the turning of the water AQ (liquid). In the mist generating nozzle X1, a large amount (large number) of mist water (water droplets/liquid droplets) in which a large amount (large number) of microbubbles and a large amount (large number) of ultrafine bubbles are mixed and dissolved can be generated (produced) merely by ejecting the water AQ (liquid) into outside air from the first and second ejection ports 4 and 5.

The first hole interval H1 and the first hole interval H2 are set to such intervals as to allow a part of the water AQ (liquid) ejected from the first ejection port 4 at the first acute angle θ1 and a part of the water AQ (liquid) ejected from the second ejection port 5 at the second acute angle θ2 to collide with each other (intervals enabling collision).

The mist generating nozzle (mist generating nozzle device/mist generator) according to the second embodiment is described with reference to FIG. 8 to FIG. 29.

In FIG. 8 to FIG. 29, the same reference symbols as those in FIG. 1 to FIG. 7 denote the same members and the same configurations, and hence the detailed description thereof is omitted.

In FIG. 8 to FIG. 14, a mist generating nozzle X2 according to the second embodiment (hereinafter referred to as "mist generating nozzle X2") includes a nozzle main body Y2.

As illustrated in FIG. 8 to FIG. 29, the nozzle main body Y2 (nozzle means) includes a nozzle tubular portion 15, a jet plate 16 (ejection plate/nozzle plate), a plurality of opening hole groups 17 (guide holes 18, first and second ejection ports 19 and 20, first and second inflow ports 21 and 22, and first and second nozzle holes 23 and 24), and a mist piece 31 (piece member/mist piece member/core).

Figure 15:
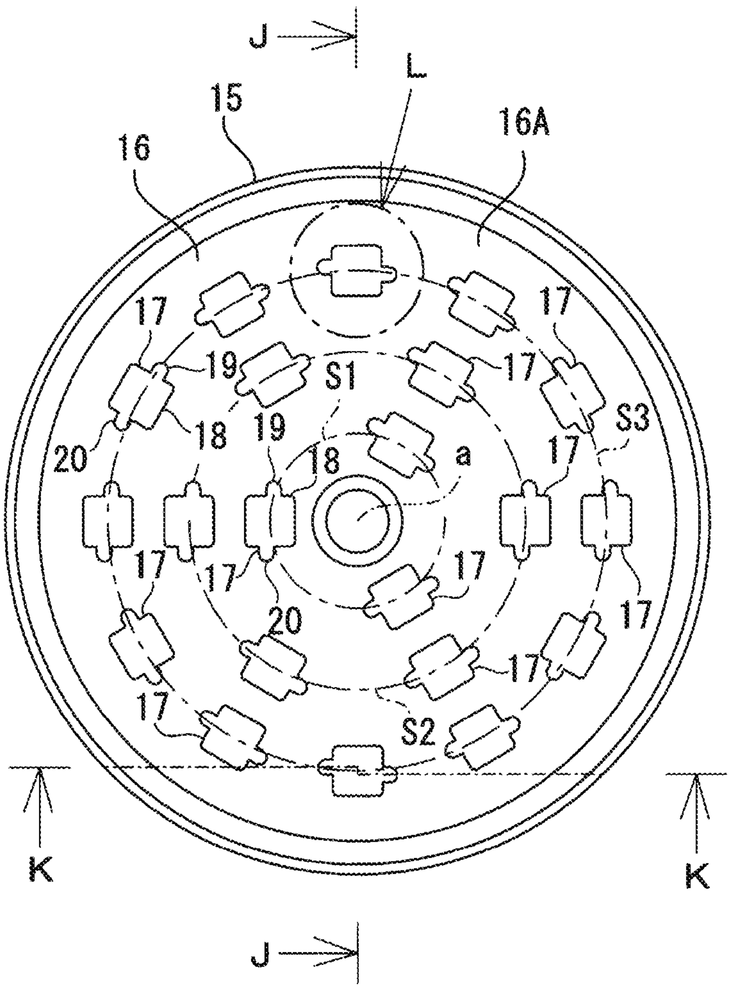
FIG. 15 is a front plan view (front surface view) for illustrating a nozzle tubular portion, a jet plate, and opening hole groups in the mist generating nozzle according to the second embodiment.
Figure 16:
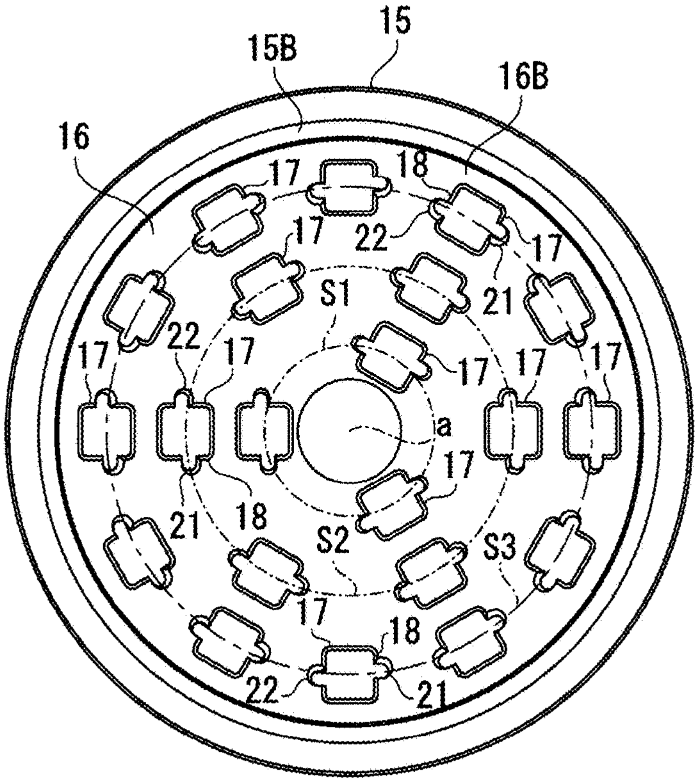
FIG. 16 is a bottom plan view (back surface view) for illustrating the nozzle tubular portion, the jet plate, and the opening hole groups in the mist generating nozzle according to the second embodiment.
Figure 17:
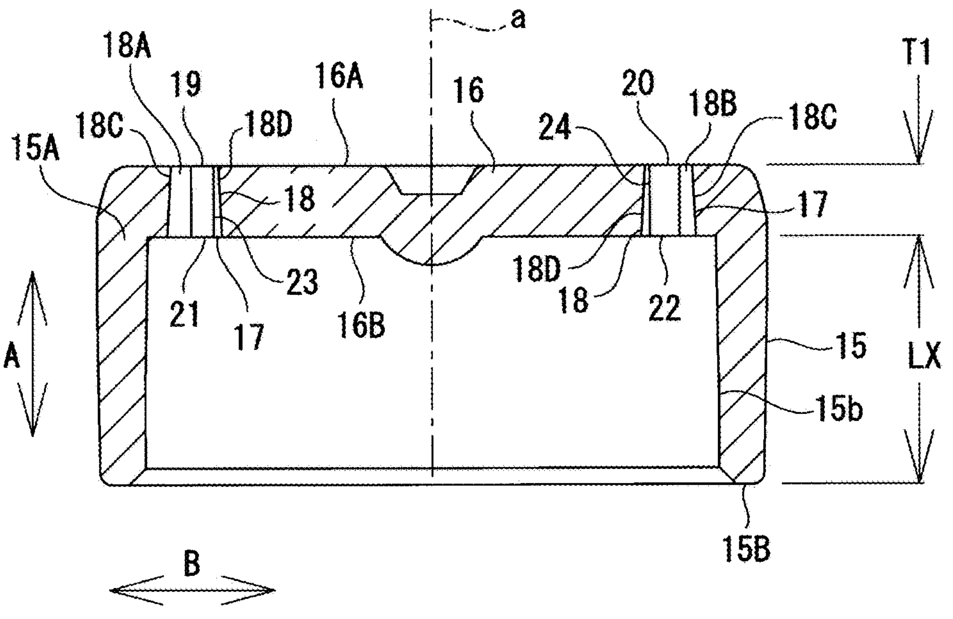
FIG. 17 is a sectional view taken along the line J-J of FIG. 15.
Figure 18:
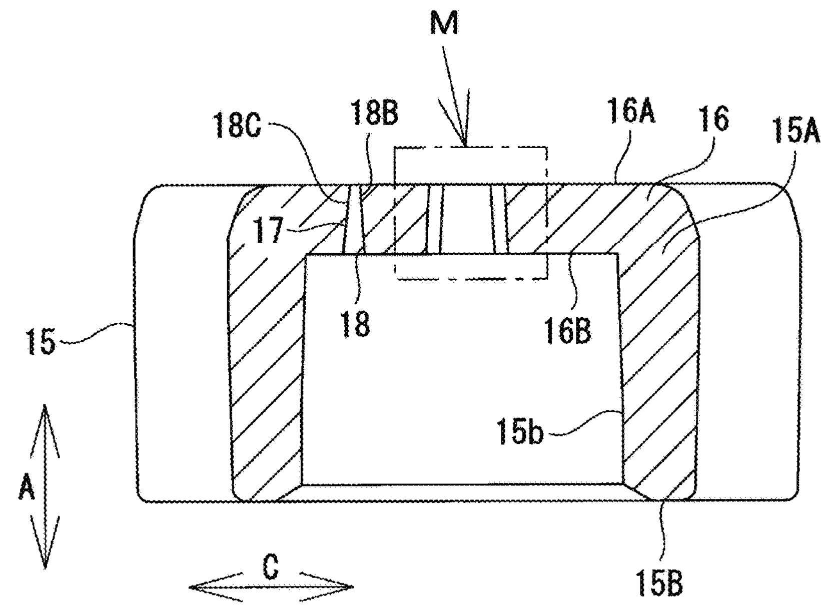
FIG. 18 is a sectional view taken along the line K-K of FIG. 15.

As illustrated in FIG. 15 to FIG. 17, the nozzle tubular portion 15 is formed in, for example, a cylindrical shape (cylindrical body). The nozzle tubular portion 15 has an inner peripheral diameter DA. The nozzle tubular portion 15 has a tube length LX between each of tube ends 15A and 15B in the direction of the tube center line "a".

As illustrated in FIG. 15 to FIG. 18, the jet plate 16 is formed in, for example, a circular shape (circular plate). The jet plate 16 has a front surface 16A and a back surface 16B in the plate thickness direction A (direction of a plate center line). The front surface 16A and the back surface 16B of the jet plate 16 are arranged in parallel with the plate thickness T in the plate thickness direction A.

The jet plate 16 closes one tube end 15A of the nozzle tubular portion 15, and is fixed to the nozzle tubular portion 15. The jet plate 16 is arranged concentrically with the nozzle tubular portion 15. The jet plate 16 closes the one tube end 15A of the nozzle tubular portion 15 so that the back surface 16B of the jet plate 16 is brought into abutment against the one tube end 15A of the nozzle tubular portion 15.

The jet plate 16 and the nozzle tubular portion 15 are integrally formed, for example, with a synthetic resin.

Figure 19:
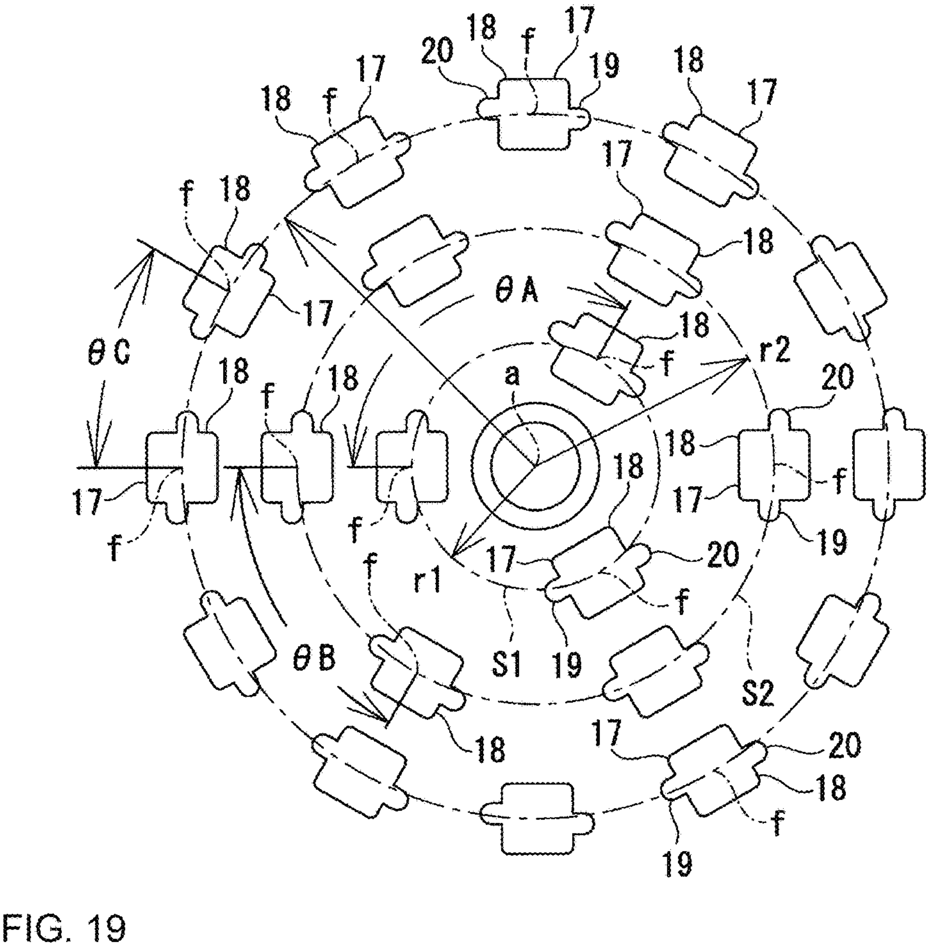
FIG. 19 is a top plan view (top view) for illustrating arrangement of each of the opening hole groups.

As illustrated in FIG. 15 to FIG. 22, each of the opening hole groups 17 is formed in the jet plate 16. As illustrated in FIG. 15, FIG. 16, and FIG. 19, each of the opening hole groups 17 is arranged, for example, on a circle S1 having a radius r1 (diameter DS), on a circle S2 having a radius r2 (diameter DT), and on a circle S3 having a radius r3 each located on the jet plate 16 with the plate center line "a" of the jet plate 16 as the center. The radius r2 of the circle S2 is a radius larger than the radius r1 of the circle S1 ($r1<r2$), and the radius r3 of the circle S3 is a radius larger than the radius r2 of the circle S2 ($r2<r3$). Each of the opening hole groups 17 is arranged so that one or a plurality of opening hole groups 17 are formed on each of the circles S1, S2, and S3. For example, three opening hole groups 17 are arranged on the circle S1 (first circle), six opening hole groups 17 are arranged on the circle S2 (second circle), and twelve opening hole groups 17 are arranged on the circle S3 (third circle).

As illustrated in FIG. 19, each of the opening hole groups 17 on the circle S1 is arranged at first hole arrangement angles θA (for example, θA=120°) between each of the opening hole groups 17 in a peripheral direction (circumferential direction) of the jet plate 16 (circle S1). As illustrated in FIG. 19, each of the opening hole groups 17 on the circle S2 is arranged at an interval of second hole arrangement angles θB (for example, θB=60°) between each of the opening hole groups 17 in the peripheral direction (circumferential direction) of the jet plate 16 (circle S2). As illustrated in FIG. 19, each of the opening hole groups 17 on the circle S3 is arranged at third hole arrangement angles θC (for example, θC=30°) between each of the opening hole groups 17 in the peripheral direction (circumferential direction) of the jet plate 16 (circle S3).

As illustrated in FIG. 15 to FIG. 22, each of the opening hole groups 17 (nozzle main body Y2) is formed so as to include the guide hole 18, the first ejection port 19, the second ejection port 20, the first inflow port 21, the second inflow port 22, the first nozzle hole 23, and the second nozzle hole 24.

As illustrated in FIG. 15 to FIG. 22, in each of the opening hole groups 17, the guide hole 18 is formed in, for example, a truncated quadrangular pyramid shape (truncated quadrangular pyramid hole/hole having a truncated quadrangular pyramid shape). The guide hole 18 (truncated quadrangular pyramid hole) of each of the opening hole groups 17 penetrates through the jet plate 16 in the plate thickness direction A, and is opened to the front surface 16A and the back surface 16B of the jet plate 16. The guide hole 18 (truncated quadrangular pyramid hole) of each of the opening hole groups 17 extends between the front surface 16A and the back surface 16B of the jet plate 16 while gradually expanding from the front surface 16A toward the back surface 16B of the jet plate 16 in the plate thickness direction A.

As illustrated in FIG. 19, the guide hole 18 (truncated quadrangular pyramid hole) of each of the opening hole groups 17 is arranged so that a guide hole center line "f" of the truncated quadrangular pyramid hole is located at (matched with) each of the circles S1, S2, and S2.

The guide hole 18 of each of the opening hole groups 17 is arranged so that the guide hole center line "f" is located at (matched with) the circle S1 for each first hole arrangement angle θA in the circle S1. The guide hole 18 of each of the opening hole groups 17 is arranged so that the guide hole center line "f" is located at (matched with) the circle S2 for each second hole arrangement angle θB in the circle S2. The guide hole 18 of each of the opening hole groups 17 is arranged so that the guide center line "f" is located at (matched with) the circle S3 for each third hole arrangement angle θC in the circle S3.

Figure 20A:
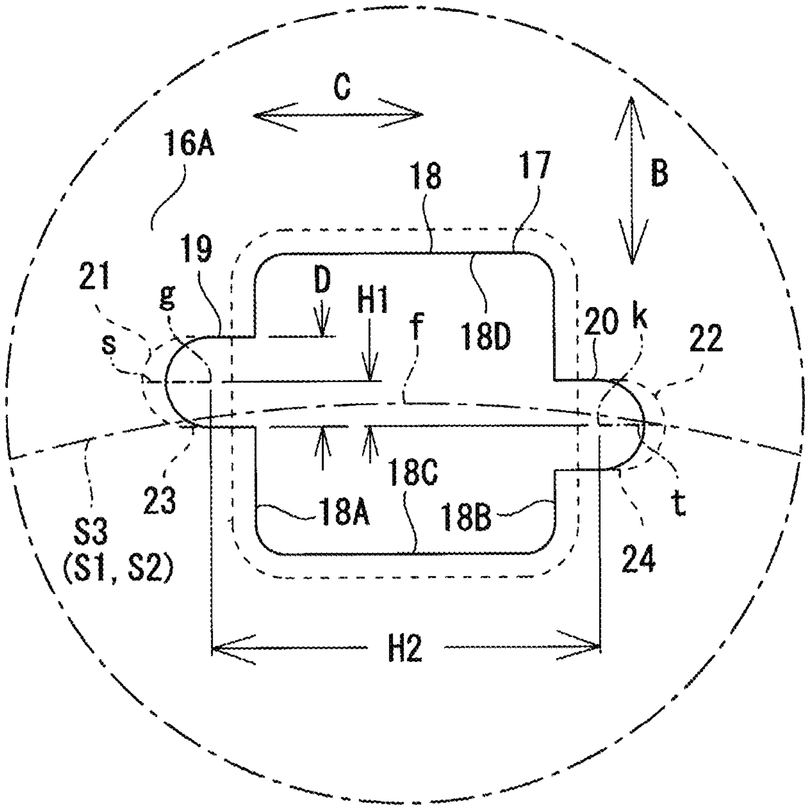
FIG. 20(*a*) is an enlarged view of an L-portion of FIG. 15, and FIG. 20(*b*) is a partially enlarged view of FIG. 20(*a*) for illustrating the first and second ejection ports, first and second inflow ports, and first and second nozzle holes.
Figure 20B:
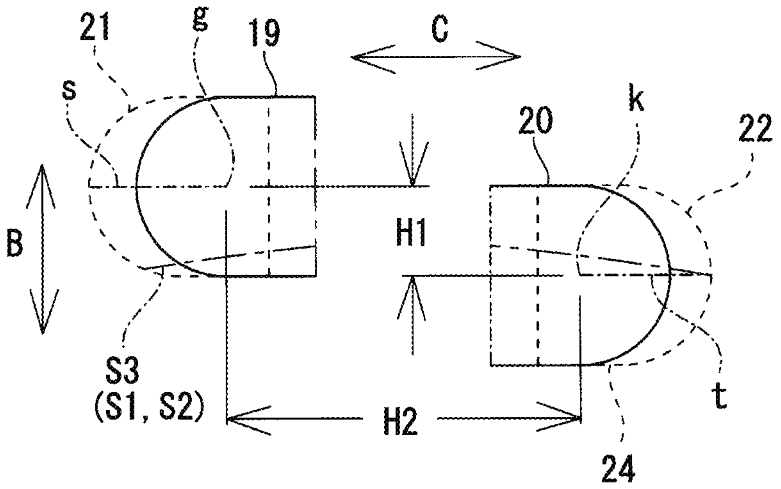
Figure 21A:
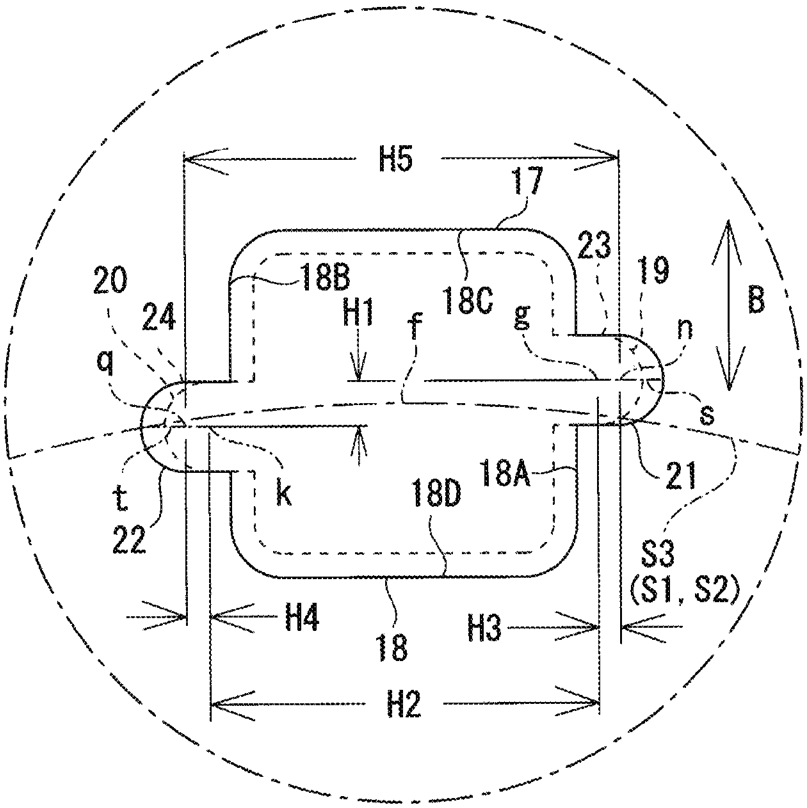
FIG. 21(*a*) is a back surface view of FIG. 20(*a*), and FIG. 21(*b*) is a partially enlarged view of FIG. 21(*a*) for illustrating the first and second ejection ports, the first and second inflow ports, and the first and second nozzle holes.
Figure 21B:
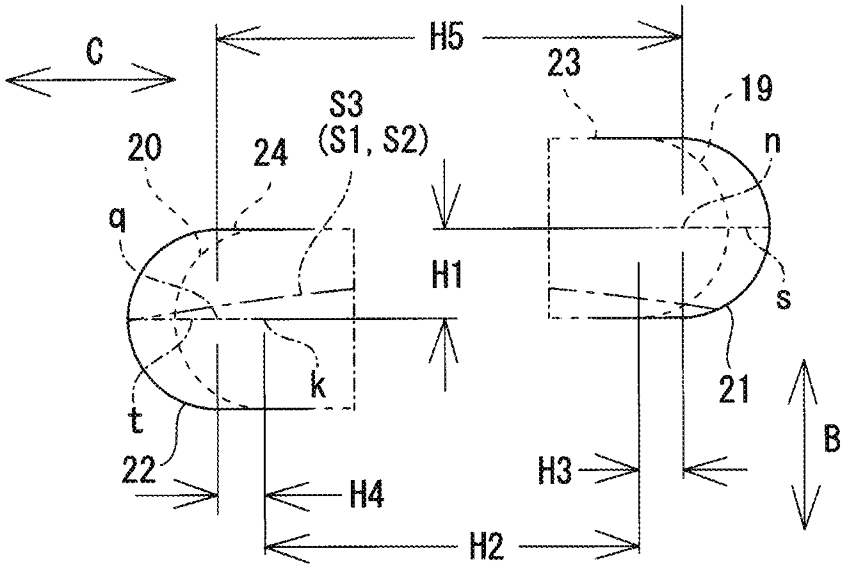
Figure 22:
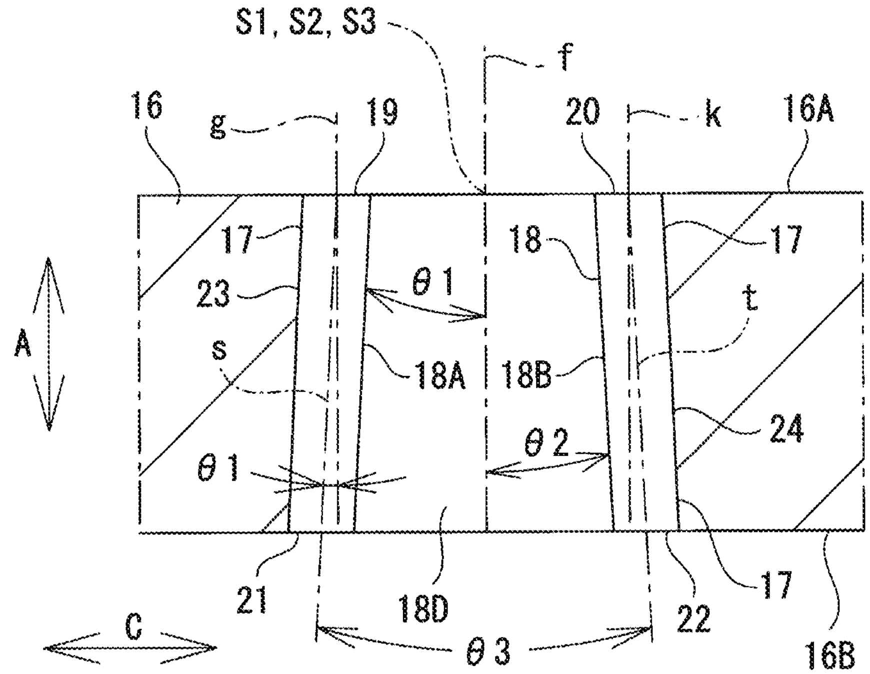
FIG. 22 is an enlarged view of an M-portion of FIG. 18.
Figure 23:
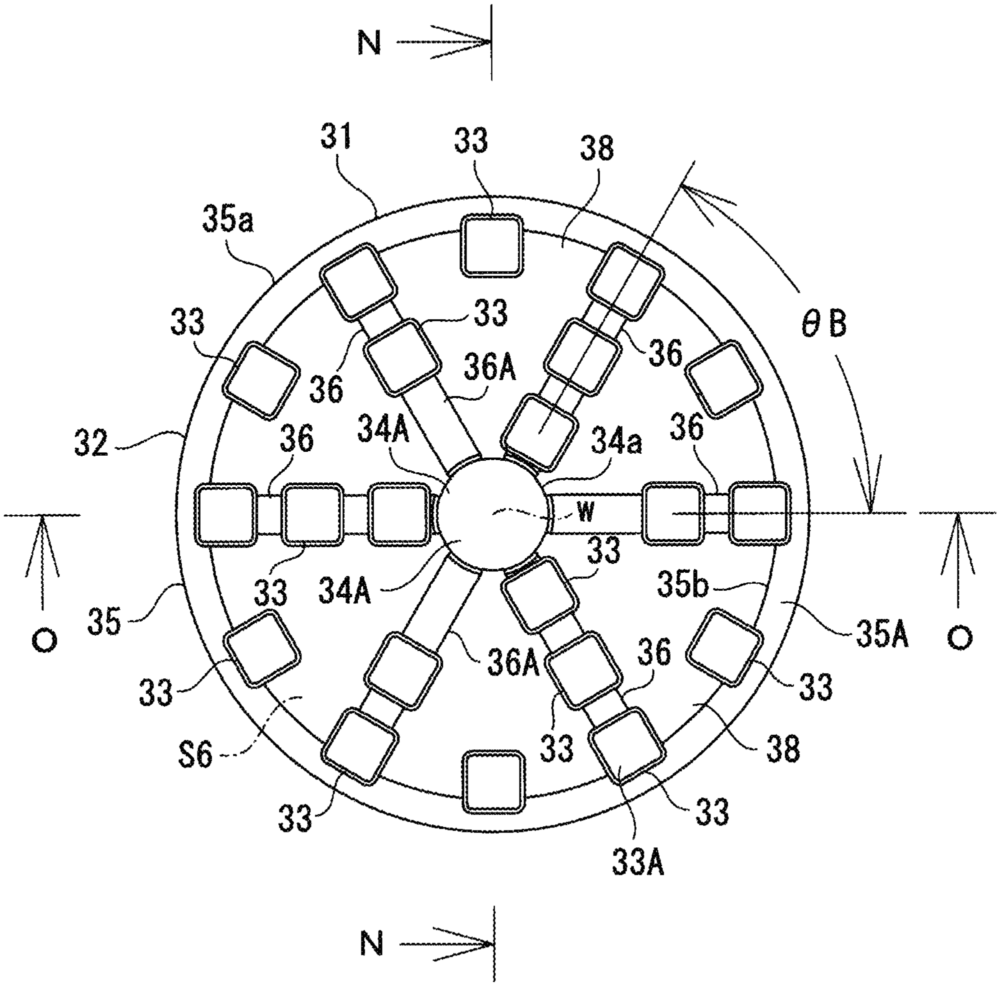
FIG. 23 is a top plan view (top view) for illustrating a mist piece.

As illustrated in FIG. 20 to FIG. 22, the guide hole 18 of each of the opening hole groups 17 has first and second inclined inner side surfaces 18A and 18B (first and second inner side surfaces/inclined inner side surfaces) in a direction C of a tangent in contact with each of the circles S1, S2, and S3 (hereinafter referred to as "tangent direction of the circles S1, S2, and S3") at an intersection point (contact point) of each of the circles S1, S2, and S3 and the guide hole center line "f". The guide hole 18 of each of the opening hole groups 17 has third and fourth inclined inner side surfaces 18C and 18D (third and fourth inner side surfaces/inclined inner side surfaces) in a radial direction B (first direction) perpendicular to the tangent of each of the circles S1, S2, and S3.

As illustrated in FIG. 20 to FIG. 22, the first and second inclined inner side surfaces 18A and 18B of the guide hole 18 of each of the opening hole groups 17 are arranged to intersect the tangent of each of the circles S1, S2, and S3, and are arranged in parallel at an inner surface interval between the first and second inclined inner side surfaces 18A and 18B in the tangent direction C (second direction) of each of the circles S1, S2, and S3.

As illustrated in FIG. 22, the first inclined inner side surface 18A of the guide hole 18 of each of the opening hole groups 17 is arranged at the first acute angle θ1 between the first inclined inner side surface 18A and the guide hole center line "f" of the guide hole 18 in the tangent direction C (second direction) of each of the circles C1, C2, and C3. The first inclined inner side surface 18A is arranged between the front surface 16A and the back surface 16B of the jet plate 16 so as to extend from the front surface 16A of the jet plate 16 toward the back surface 16B of the jet plate 16 while being separated from the second inclined inner side surface 18B at the first acute angle θ1 between the first inclined inner side surface 18A and the guide hole center line "f" of the guide hole 18 in the tangent direction C (second direction) of each of the circles S1, S2, and S3.

As illustrated in FIG. 22, the second inclined inner side surface 18B of the guide hole 18 of each of the opening hole groups 17 is arranged at the second acute angle θ2 between the second inclined inner side surface 18B and the guide hole center line "f" of the guide hole 18 in the tangent direction C (second direction) of each of the circles C1, C2, and C3. The second inclined inner side surface 18B is arranged between the front surface 16A and the back surface 16B of the jet plate 16 so as to extend from the front surface 16A of the jet plate 16 toward the back surface 16B of the jet plate 16 while being separated from the first inclined inner side surface 18A at the second acute angle θ2 between the second inclined inner side surface 18B and the guide hole center line "f" of the guide hole 18 in the tangent direction C (second direction) of each of the circles S1, S2, and S3.

As illustrated in FIG. 15 and FIG. 17 to FIG. 22, the first ejection port 19 and the second ejection port 20 (first and second ejection hole ports) of each of the opening hole groups 17 are formed on the jet plate 16. The first ejection port 19 and the second ejection port 20 of each of the opening hole groups 17 are opened to the front surface 16A of the jet plate 16. The first ejection port 19 and the second ejection port 20 of each of the opening hole groups 17 are opened to the front surface 16A of the jet plate 16 without communicating to each other. The second ejection port 20 of each of the opening hole groups 17 is opened to the front surface 16A of the jet plate 16 without communicating to the first ejection port 19.

The first ejection port 19 and the second ejection port 20 of each of the opening hole groups 17 are arranged adjacent to the guide hole 18 of each of the opening hole groups 17.

As illustrated in FIGS. 20, the first ejection port 19 and the second ejection port 20 of each of the opening hole groups 17 are arranged at the first hole interval H1 between a center line "g" (hole port center line) of the first ejection port 19 and a center line "k" (hole port center line) of the second ejection port 20 in the radial direction B (first direction) of each of the circles S1, S2, and S3. The first ejection port 19 of each of the opening hole groups 17 is opened to the front surface 16A of the jet plate 16 at the first hole interval H1 from the second ejection port 20 of each of the opening hole groups 17 in the radial direction B of each of the circles S1, S2, and S3. The second ejection port 20 of each of the opening hole groups 17 is opened to the front surface 16A of the jet plate 16 at the first hole interval H1 from the first ejection port 19 of each of the opening hole groups 17 in the radial direction B of each of the circles S1, S2, and S3.

As illustrated in FIG. 20, the first ejection port 19 and the second ejection port 20 of each of the opening hole groups 17 are arranged on both sides of the guide hole 18 of each of the opening hole groups 17 in the tangent direction C so that the guide hole 18 is located between the first ejection port 19 and the second ejection port 20 in the tangent direction C (second direction) of each of the circles S1, S2, and S3.

The first ejection port 19 and the second ejection port 20 of each of the opening hole groups 17 are arranged at the second hole interval H2 between the center line "g" of the first ejection port 19 and the center line "k" of the second ejection port 20 in the tangent direction C of each of the circles S1, S2, and S3. The first ejection port 19 of each of the opening hole groups 17 is arranged at the second hole interval H2 from the second ejection port 20 of each of the opening hole groups 17 so that the guide hole 18 of each of the opening hole groups 17 is located between the first ejection port 19 and the second ejection port 20 of each of the opening hole groups 17 in the tangent direction C of each of the circles S1, S2, and S3. The second ejection port 20 of each of the opening hole groups 17 is arranged at the second hole interval H1 from the first ejection port 19 of each of the opening hole groups 17 so that the guide hole 18 of each of the opening hole groups 17 is located between the second ejection port 20 and the first ejection port 19 of each of the opening hole groups 17 in the tangent direction C of each of the circles S1, S2, and S3.

As illustrated in FIG. 20 and FIG. 22, the first ejection port 19 and the second ejection port 20 of each of the opening hole groups 17 extend in the tangent direction C (second direction) of each of the circles S1, S2, and S3, and is opened to the guide hole 18 of each of the opening hole groups 17. The first ejection port 19 and the second ejection port 20 of each of the opening hole groups 17 are each, for example, a long hole port (long port) with one port end side formed in a semicircular shape (semicircular port/semicircular hole port), and are each arranged with another port end opened to the guide hole 18 of each of the opening hole groups 17 in the tangent direction C (second direction) of each of the circles S1, S2, and S3. The first ejection port 19 and the second ejection port 20 of each of the opening hole groups 17 are each a long hole port (long port) with the one port end side formed in a semicircular shape having the diameter D, and are each opened to the front surface 16A of the jet plate 16 and the guide hole 18 of each of the opening hole groups 17 with the port width D in the radial direction B (first direction) of each of the circles S1, S2, and S3.

In the first and second ejection ports 19 and 20 of each of the opening hole groups 17, the first hole interval H1 is set to an interval of more than 0 (zero) and less than the port width D.

In the first and second ejection ports 19 and 20 of each of the opening hole groups 17, the second hole interval H1 is a hole width of the guide hole 18 in the tangent direction C (second direction) of each of the circles S1, S2, and S3, and is set to an interval of several millimeters or less than three times the port width D of each of the first and second ejection ports 19 and 20. The guide hole 18 of each of the opening hole groups 17 has a hole width of several millimeters or less than three times the port width D of each of the first and second ejection ports 19 and 20 in the tangent direction C (second direction) of each of the circles S1, S2, and S3, and communicates to the first and second ejection ports 19 and 20 of each of the opening hole groups 17 to be opened to the front surface 16A of the jet plate 16.

As illustrated in FIG. 16, FIG. 17, FIG. 20, and FIG. 22, the first inflow port 21 and the second inflow port 22 (first and second inflow hole ports) of each of the opening hole groups 17 are formed on the jet plate 16. The first inflow port 21 and the second inflow port 22 of each of the opening hole groups 17 are opened to the back surface 16B of the jet plate 16.

As illustrated in FIG. 21, the first inflow port 21 and the second inflow port 22 of each of the opening hole groups 17 are arranged at the first hole interval H1 between a center line "n" (hole port center line) of the first inflow port 21 and a center line "q" (hole port center line) of the second inflow port 22 in the radial direction B (first direction) of each of the circles S1, S2, and S3.

As illustrated in FIG. 21 and FIG. 22, the first inflow port 21 of each of the opening hole groups 17 is arranged so that the first ejection port 19 and the guide hole 18 of each of the opening hole groups 17 are located between the first inflow port 21 and the second ejection port 20 of each of the opening hole groups 17. The first inflow port 21 of each of the opening hole groups 17 is opened to the back surface 16B of the jet plate 16 at the third hole interval H3 between the center line "n" of the first inflow port 21 and the center line "g" of the first ejection port 19 in the tangent direction C (second direction) of each of the circles S1, S2, and S3. The first inflow port 21 of each of the opening hole groups 17 is opened to the back surface 16B of the jet plate 16 at the third hole interval H3 from the first ejection port 19 of each of the opening hole groups 17 in the tangent direction C (second direction) of each of the circles S1, S2, and S3.

As illustrated in FIG. 21 and FIG. 22, the second inflow port 22 of each of the opening hole groups 17 is arranged so that the second ejection port 20 and the guide hole 18 of each of the opening hole groups 17 are located between the second inflow port 22 and the first ejection port 19 of each of the opening hole groups 17. The second inflow port 22 of each of the opening hole groups 17 is opened to the back surface 16B of the jet plate 16 at the fourth hole interval H4 between the center line "q" of the second inflow port 22 and the center line "k" of the second ejection port 20 in the tangent direction C (second direction) of each of the circles S1, S2, and S3. The second inflow port 22 of each of the opening hole groups 17 is opened to the back surface 16B of the jet plate 16 at the fourth hole interval H4 from the second ejection port 20 of each of the opening hole groups 17 in the tangent direction C (second direction) of each of the circles S1, S2, and S3.

As illustrated in FIG. 21, the first inflow port 21 and the second inflow port 22 of each of the opening hole groups 17 are arranged at the fifth hole interval H5 larger (wider) than the second hole interval H in the tangent direction C (second direction) of each of the circles S1, S2, and S3.

As illustrated in FIG. 21 and FIG. 22, the first inflow port 21 and the second inflow port 22 of each of the opening hole groups 17 extend in the tangent direction C (second direction) of each of the circles S1, S2, and S3, and are opened to the guide hole 18 of each of the opening hole groups 17. The first inflow port 21 and the second inflow port 22 of each of the opening hole groups 17 are each, for example, the same long hole port (long port) as those of the first and second ejection ports 19 and 20, and are each arranged with another port end opened to the guide hole 18 of each of the opening hole groups 17. The first inflow port 21 and the second inflow port 22 of each of the opening hole groups 17 are opened to the back surface 16B of the jet plate 16 and the guide hole 18 of each of the opening hole groups 17 with the port width D in the radial direction B (first direction) of each of the circles S1, S2, and S3.

As illustrated in FIG. 17 and FIG. 20 to FIG. 22, the first nozzle hole 23 of each of the opening hole groups 17 is formed in the jet plate 16. As illustrated in FIG. 22, the first nozzle hole 23 of each of the opening hole groups 17 is formed so as to be connected to the first ejection port 19 and the first inflow port 21 of each of the opening hole groups 17 and to penetrate through the jet plate 16 in the plate thickness direction A. The first nozzle hole 23 of each of the opening hole groups 17 extends between the first ejection port 19 and the first inflow port 21 of each of the opening hole groups 17 at the first acute angle θ1 between a hole center line "s" of the first nozzle hole 23 and the center line "g" of the first ejection port 19 in the tangent direction C (second direction) of each of the circles S1, S2, and S3, and is connected to the first ejection port 19 and the first inflow port 21 of each of the opening hole groups 17. The first nozzle hole 23 of each of the opening hole groups 17 extends from the first ejection port 19 (front surface 16A of the jet plate 16) of each of the opening hole groups 17 toward the back surface 16B of the jet plate 16 while being separated from the first and second ejection ports 19 and 20 of each of the opening hole groups 17 at the first acute angle θ1 between the hole center line "s" of the first nozzle hole 23 and the center line "g" of the first ejection port 19 of each of the opening hole groups 17 in the tangent direction C of each of the circles S1, S2, and S3, and is connected to the first inflow port 21 of each of the opening hole groups 17.

As illustrated in FIG. 22, the first nozzle hole 23 of each of the opening hole groups 17 extends in the tangent direction C (second direction) of each of the circles S1, S2, and S3, and is opened to the guide hole 18 (first inclined inner side surface 18A) of each of the opening hole groups 17. The first nozzle hole 23 of each of the opening hole groups 17 is formed in, for example, the same shape as that of the long hole port of each of the first and second ejection ports 19 and 20. The first nozzle hole 23 of each of the opening hole groups 17 is a long hole with one hole end side formed in a semicircular shape having the diameter D, and is arranged with another hole end opened to the first inclined inner side surface 18A of the guide hole 18 of each of the opening hole groups 17.

The first nozzle hole 23 of each of the opening hole groups 17 is arranged with the one hole end side opened to the first inclined inner side surface 18A of the guide hole 18 of each of the opening hole groups 17 over a region between the first ejection port 19 and the first inflow port 21 in the plate thickness direction A.

As illustrated in FIG. 17 and FIGS. 20 to FIG. 22, the second nozzle hole 24 of each of the opening hole groups 17 is formed in the jet plate 16. As illustrated in FIG. 22, the second nozzle hole 24 of each of the opening hole groups 17 is formed so as to be connected to the second ejection port 20 and the second inflow port 22 of each of the opening hole groups 17 and to penetrate through the jet plate 16 in the plate thickness direction A. The second nozzle hole 24 of each of the opening hole groups 17 extends between the second ejection port 20 and the second inflow port 22 of each of the opening hole groups 17 at the second acute angle θ2 between a hole center line "t" of the second nozzle hole 24 and the center line "k" of the second ejection port 20 in the tangent direction C (second direction) of each of the circles S1, S2, and S3, and is connected to the second ejection port 20 and the second inflow port 22 of each of the opening hole groups 17. The second nozzle hole 24 of each of the opening hole groups 17 extends from the second ejection port 20 (front surface 16A of the jet plate 16) of each of the opening hole groups 17 toward the back surface 16B of the jet plate 16 while being separated from the first and second ejection ports 19 and 20 of each of the opening hole groups 17 at the second acute angle θ2 between the hole center line "t" of the second nozzle hole 24 and the center line "g" of the second ejection port 20 of each of the opening hole groups 17 in the tangent direction C of each of the circles S1, S2, and S3, and is connected to the second inflow port 22 of each of the opening hole groups 17.

As illustrated in FIG. 22, the second nozzle hole 24 of each of the opening hole groups 17 extends in the tangent direction C (second direction) of each of the circles S1, S2, and S3, and is opened to the guide hole 18 (second inclined inner side surface 18B) of each of the opening hole groups 17. The second nozzle hole 24 of each of the opening hole groups 17 is formed in, for example, the same shape as that of the long hole port of each of the first and second ejection ports 19 and 20. The second nozzle hole 24 of each of the opening hole groups 17 is a long hole with one hole end side formed in a semicircular shape having the diameter D, and is arranged with another hole end opened to the second inclined inner side surface 18B of the guide hole 18 of each of the opening hole groups 17.

The second nozzle hole 24 of each of the opening hole groups 17 is arranged with the one hole end side opened to the second inclined inner side surface 18B of the guide hole 18 of each of the opening hole groups 17 over a region between the second ejection port 20 and the second inflow port 22 in the plate thickness direction A.

As illustrated in FIG. 22, the first nozzle hole 23 and the second nozzle hole 24 of each of the opening hole groups 17 are arranged at the hole-to-hole angle θ3 between the hole center line "s" of the first nozzle hole 23 and the hole center line "t" of the second nozzle hole 24 in the tangent direction C (second direction) of each of the circles S1, S2, and S3.

As illustrated in FIG. 20 and FIGS. 21, the first nozzle hole 23 and the second nozzle hole 24 of each of the opening hole groups 17 are arranged in parallel at the first hole interval H1 between the hole center line "s" of the first nozzle hole 23 and the hole center line "t" of the second nozzle hole 24 in the radial direction B (first direction) of each of the circles S1, S2, and S3.

As illustrated in FIG. 23 to FIG. 29, the mist piece 31 (piece member) includes a base 32 and a plurality of guide protrusions 33 (guide cores).

As illustrated in FIG. 23 to FIG. 29, the base 32 includes a base column 34, a base ring 35 (base cylindrical portion), a plurality of base legs 36 (base rims), and a plurality of base protrusions 37.

As illustrated in FIG. 23 to FIG. 27, the base column 34 is formed in, for example, a columnar shape (columnar body) having an outer peripheral diameter DB. The outer peripheral diameter DB of the base column 34 is a diameter smaller than the diameter DS (DS=2×r1) of the circle S1 on which each of the opening hole groups 17 is arranged. The base column 34 has a column end front surface 34A (column end face) and a column end back surface 34B (column end face) in a direction E of a column center line. The column end front surface 34A and the column end back surface 34B of the base column 34 are arranged in parallel with a column length T1 in the direction E of the column center line. The column length T1 of the base column 34 is shorter than the tube length LX of the nozzle tubular portion 15.

As illustrated in FIG. 23 to FIG. 27, the base ring 35 is formed in, for example, a cylindrical shape (cylindrical body). The base ring 35 has a tube end front surface 35A (tube end face) and a tube end back surface 35B (tube end face) in a direction E of a tube center line. The tube end front surface 35A and the tube end back surface 35B of the base ring 35 are arranged in parallel with a tube length T1 (same length as that of the base column 34) in the direction E of the tube center line. The base ring 35 has an outer peripheral diameter DC and an inner peripheral diameter dc. The outer peripheral diameter DC of the base ring 35 is a diameter that is substantially the same as (diameter that is slightly smaller than) the inner peripheral diameter DA of the nozzle tubular portion 15. The inner peripheral diameter dc of the base ring 35 is a diameter larger than the diameter DT ($DT=2\times r2$) of the circle S2 on which each of the opening hole groups 17 is arranged.

As illustrated in FIG. 23 to FIG. 27, the base ring 35 is externally fitted to the base column 34, and is arranged concentrically with the base column 34. The base ring 35 is arranged so that the tube end front surface 35A of the base ring 35 is flush with the column end front surface 34A of the base column 34. The base ring 35 is arranged at an annular interval between an inner peripheral surface 35*b* of the base ring 35 and an outer peripheral surface 34*a* of the base column 34.

As illustrated in FIG. 23 to FIG. 27, each of the base legs 36 is formed in, for example, an elongated plate shape (elongated plate). Each of the base legs 36 has a leg plate front surface 36A and a leg plate back surface 36B in a plate thickness direction E. The leg plate front surface 36A and the leg plate back surface 36B of each of the base legs 36 are arranged in parallel with a plate thickness T1 (same plate thickness as the column length of the base column 34) in the plate thickness direction E.

As illustrated in FIG. 23 to FIG. 27, each of the base legs 36 is bridged between the outer peripheral surface 34*a* of the base column 34 and the inner peripheral surface 35*b* of the base ring 35, and is fixed to the base column 34 and the base ring 35. Each of the base legs 36 is arranged so that the leg plate front surface 36A of the base leg 36 is flush with the column end front surface 34A (column end face) of the base column 34 and the tube end front surface 35A (tube end face) of the base ring 35. Each of the base legs 36 is arranged at a leg arrangement interval OB between each of the base legs 36 in a peripheral direction (circumferential direction) of the base column 34 (base ring 35). The leg arrangement angle θB is the same angle as the second hole arrangement angle θB ($\theta B=60°$).

Each of the base legs 36 extends between the base column 34 and the base ring 35 so as to form a liquid communication hole 38 between each of the base legs 36 in the peripheral direction (circumferential direction) of the base column 34 (base ring 35).

Figure 25:
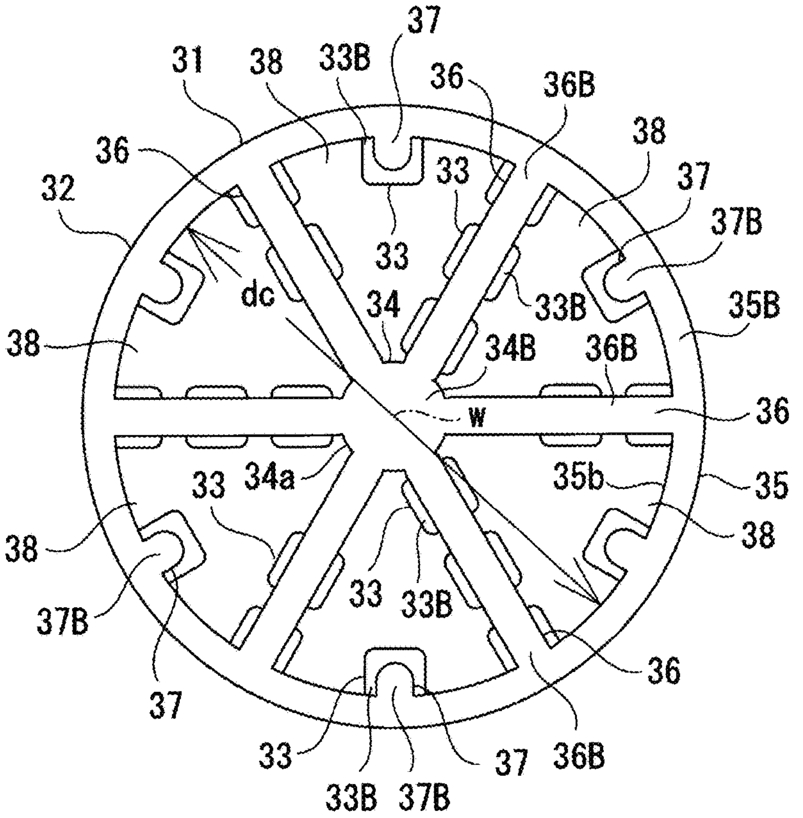
FIG. 25 is a bottom plan view (bottom view) for illustrating the mist piece.
Figure 26:
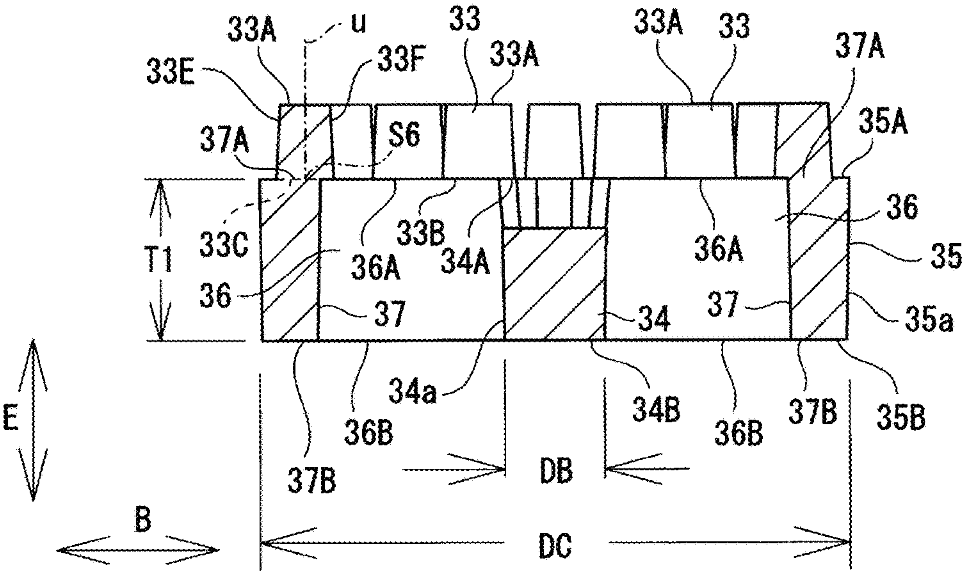
FIG. 26 is a sectional view taken along the line N-N of FIG. 23.

As illustrated in FIG. 25 to FIG. 26, each of the base protrusions 37 (base protruding portion) is formed in, for example, a short plate shape (short plate shape). Each of the base protrusions 37 has a protrusion plate front surface 37A and a protrusion plate back surface 37B in the plate thickness direction E. The protrusion plate front surface 37A and the protrusion plate back surface 37B of each of the base protrusions 37 are arranged in parallel with the plate thickness T1 in the plate thickness direction E.

As illustrated in FIG. 25 and FIG. 26, each of the base protrusions 37 is arranged at a center between each of the base legs 36 in the peripheral direction (circumferential direction) of the base ring 35, and is fixed to the base ring 35. Each of the base protrusions 37 is arranged so that the protrusion plate front surface 37A of the base protrusion 37 is flush with the tube end front surface 35A (tube end face) of the base ring 35. Each of the base protrusions 37 is arranged inside each of the liquid communication holes 38 so as to protrude from the inner peripheral surface 35*b* of the base ring 35 toward the base column 34 in a radial direction of the base ring 35. Each of the base protrusions 37 is cantilevered on the base ring 35 at an interval from the outer peripheral surface 34*a* of the base column 34, and protrudes to each of the liquid communication holes 38.

As illustrated in FIG. 23 to FIG. 29, each of the guide protrusions 33 (guide cores) is formed in, for example, a shape of a truncated quadrangular pyramid that is substantially the same as that of the guide hole 18. Each of the guide protrusions 33 is formed in a shape of a similar truncated pyramid that is slightly smaller than the guide hole 18. Each of the guide protrusions 33 has an upper surface 33A, a bottom surface 33B, and first to fourth side surfaces 33C, 33D, 33E, and 33F (first to fourth inclined side surfaces) of a truncated quadrangular pyramid. Each of the guide protrusions 33 (truncated quadrangular pyramids) has a cone height Hq that is the same as the plate thickness T of the jet plate 16 between the upper surface 33A and the bottom surface 33B in a direction of a cone center line "u" of the truncated quadrangular pyramid (hereinafter referred to as "cone center line "u"").

As illustrated in FIG. 26 to FIG. 29, in each of the guide protrusions 33 (truncated quadrangular pyramids), the first to fourth side surfaces 33C to 33F are formed (arranged) between the upper surface 33A and the bottom surface 33B so as to be inclined while expanding from the upper surface 33A to the bottom surface 33B.

The first side surface 33C (first inclined side surface 33C) is arranged so as to be opposed to (face) the second side surface 33D (second inclined side surface), and the third side surface (third inclined side surface 33E) is arranged so as to be opposed to (face) the fourth side surface 33F (fourth inclined side surface).

Figure 29:
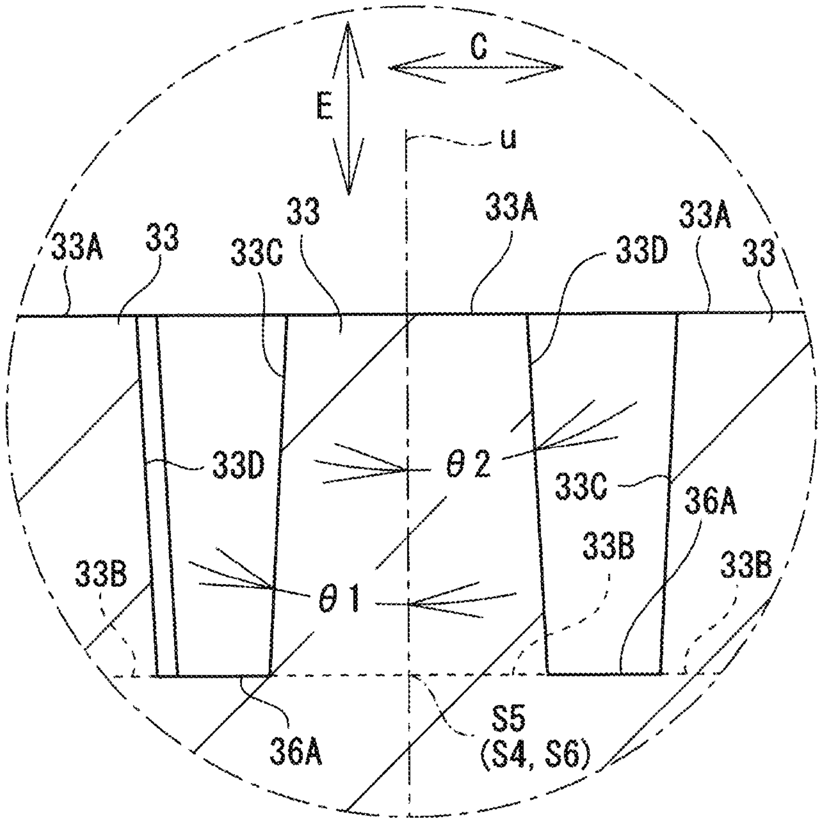
FIG. 29 is an enlarged view of a Q-portion of FIG. 17.

As illustrated in FIG. 29, the first side surface 33C is formed (arranged) at the first acute angle θ1 (same angle as that of the first inclined inner side surface 18A) with respect to the cone center line "u". The first side surface 33C is arranged (formed) between the upper surface 33A and the bottom surface 33B so as to extend from the upper surface 33A toward the bottom surface 33B while being separated from the second side surface 33D at the first acute angle θ1 with respect to the cone center line "u".

As illustrated in FIG. 29, the second side surface 33D is formed (arranged) at the second acute angle θ2 (same angle as that of the second inclined inner side surface 18B) with respect to the cone center line "u". The second side surface 33D is arranged (formed) between the upper surface 33A and the bottom surface 33B so as to extend from the upper surface 33A toward the bottom surface 33B while being separated from the first side surface 33C at the second acute angle θ2 with respect to the cone center line "u".

As illustrated in FIG. 23 to FIG. 29, each of the guide protrusions 33 (truncated quadrangular pyramid protrusions) is arranged on the base 32 (base ring 35, each of the base legs 36, and each of the base protrusions 37), and is fixed to the base 32 (base ring 35, each of the base legs 36, and each of the base protrusions 37).

Figure 24:
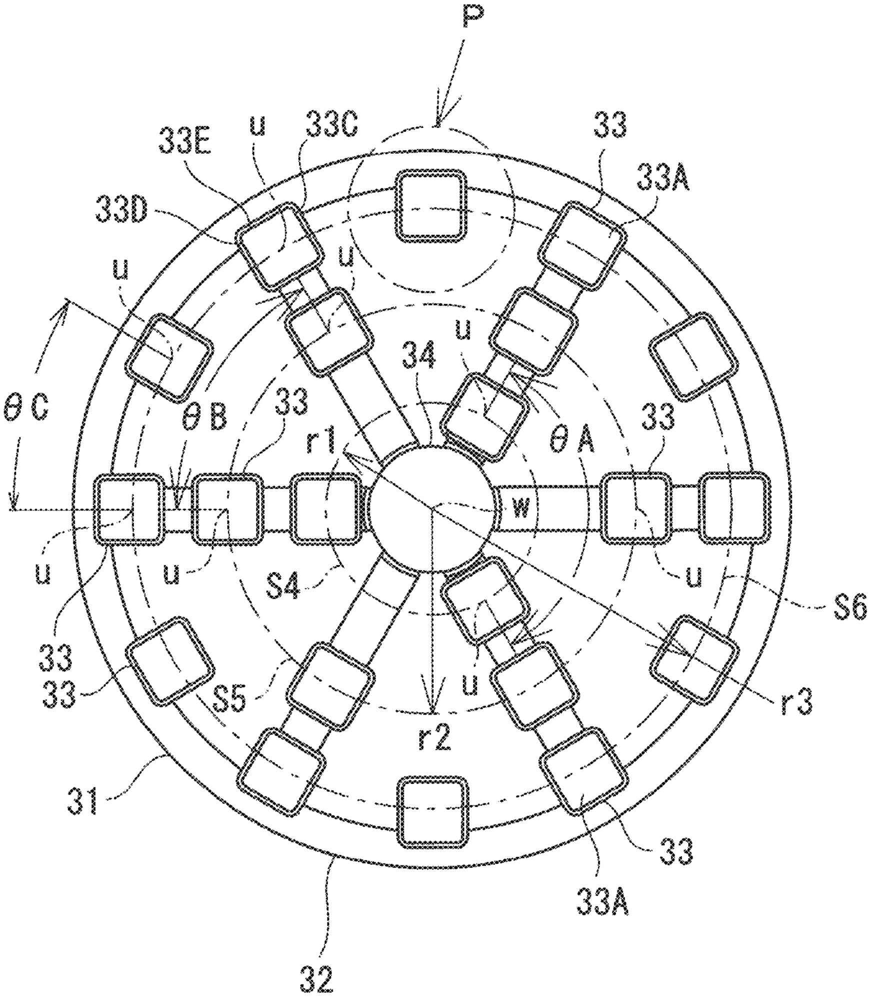
FIG. 24 is a front view for illustrating arrangement of guide protrusions in the mist piece.

As illustrated in FIG. 24, each of the guide protrusions 33 is arranged on a circle S4 having a radius r1, a circle S5 having a radius r2, and a circle S6 having a radius r3 located on the base 32 (base ring 35, each of the base legs 36, and each of the base protrusions 37) with a column center line “w” (tube center line) of the base column 34 (base ring 35) as the center. One or a plurality of guide protrusions 33 are arranged on each of the circles S4, S5, and S6. For example, three guide protrusions 33 are arranged on the circle S4 (fourth circle), six guide protrusions 33 are arranged on the circle S5 (fifth circle), and twelve guide protrusions 33 are arranged on the circle S6 (sixth circle). The radius r1 of the circle S4 is the same radius as that of the circle S1 on which each of the opening hole groups 17 is arranged. The radius r2 of the circle S5 is the same radius as that of the circle S2 on which each of the opening hole groups 17 is arranged. The radius r3 of the circle S6 is the same radius as that of the circle S3 on which the opening hole groups 17 are arranged.

Figure 27:
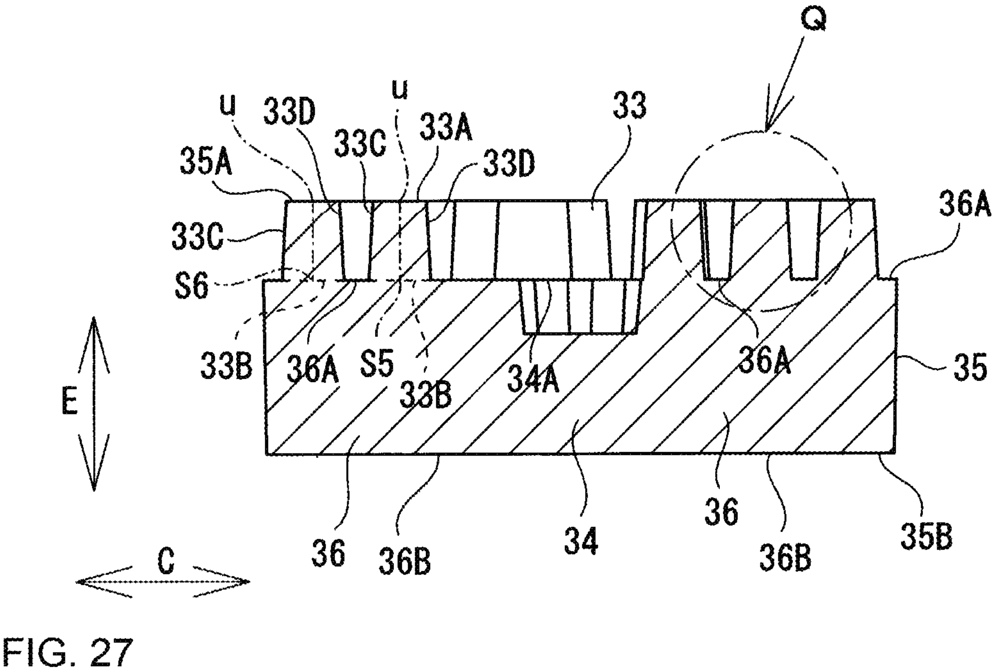
FIG. 27 is a sectional view taken along the line O-O of FIG. 23.
Figure 28:
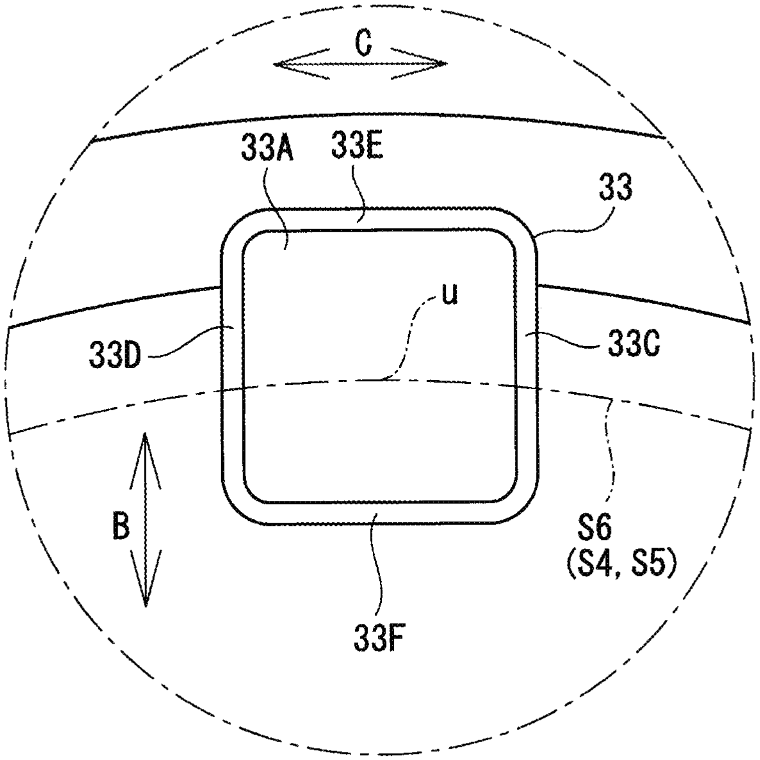
FIG. 28 is an enlarged view of a P-portion of FIG. 24.

As illustrated in FIG. 24, each of the guide protrusions 33 on the circle S4 is arranged at first protrusion arrangement angles θA between each of the guide protrusions 33 in a peripheral direction (circumferential direction) of the base column 34 (base ring 35). The first protrusion arrangement angle θA is the same as the first hole arrangement angle θA (θA=120°). Each of the guide protrusions 33 on the circle S4 is fixed to each of the base legs 36 located for each of the first protrusion arrangement angles θA in the peripheral direction of the base column 34. Each of the guide protrusions 33 on the circle S4 is arranged so that the cone center line “u” is located at (matched with) the circle S4. As illustrated in FIG. 26, FIG. 27, and FIG. 29, each of the guide protrusions 33 on the circle S4 is provided upright on each of the base legs 36 so that the bottom surface 33B of the truncated quadrangular pyramid is brought into abutment against the leg plate front surface 36A of each of the base legs 36. As illustrated in FIG. 28, each of the guide protrusions 33 on the circle S4 is arranged so that the first and second side surfaces 33C and 33D are arranged in the tangent direction C (second direction) in contact with the circle S4, the third and fourth side surfaces 33E and 33F are arranged in the radial direction B (first direction) of the circle S4 perpendicular to the tangent direction C of the circle S4, and the bottom surface 33B of the truncated quadrangular pyramid is brought into abutment against the leg plate front surface 36A of each of the base legs 36 at an intersection point (contact point) between the cone center line “u” and the circle S4.

As illustrated in FIG. 24, each of the guide protrusions 33 on the circle S5 is arranged at second protrusion arrangement angles θB between each of the guide protrusions 33 in the peripheral direction (circumferential direction) of the base column 34 (base ring 35). The second protrusion arrangement angle θB is the same as the leg arrangement angle θB and the second hole arrangement angle θB (θB=60°). Each of the guide protrusions 33 on the circle S5 is fixed to each of the base legs 36. Each of the guide protrusions 33 on the circle S5 is arranged so that the cone center line “u” is located at (matched with) the circle S5. As illustrated in FIG. 26, FIG. 27, and FIG. 29, each of the guide protrusions 33 on the circle S5 is provided upright on each of the base legs 36 so that the bottom surface 33B of the truncated quadrangular pyramid is brought into abutment against the leg plate front surface 36A of each of the base legs 36. As illustrated in FIG. 28, each of the guide protrusions 33 on the circle S5 is arranged so that the first and second side surfaces 33C and 33D are arranged in the tangent direction C (second direction) in contact with the circle S5, the third and fourth side surfaces 33E and 33F are arranged in the radial direction B (first direction) of the circle S5 perpendicular to the tangent direction C of the circle S5, and the bottom surface 33B of the truncated quadrangular pyramid is brought into abutment against the leg plate front surface 36A of each of the base legs 36 at an intersection point (contact point) between the cone center line “u” and the circle S5.

As illustrated in FIG. 24, each of the guide protrusions 33 on the circle S6 is arranged at third protrusion arrangement angles θC between each of the guide protrusions 33 in the peripheral direction (circumferential direction) of the base column 34 (base ring 35). The third protrusion arrangement angle θC is the same as the third hole arrangement angle θC (θC=30°). Each of the guide protrusions 33 on the circle S6 is fixed to each of the base legs 36 and each of the base protrusions 37. Each of the guide protrusions 33 on the circle S6 is arranged so that the cone center line “u” is located at (matched with) the circle S6. As illustrated in FIG. 26, FIG. 27, and FIG. 29, each of the guide protrusions 33 on the circle S6 is provided upright on each of the base legs 36 and each of the base protrusions 37 so that the bottom surface 33B of the truncated quadrangular pyramid is brought into abutment against the leg plate front surface 36A of each of the base legs 36 and the protrusion plate front surface 37A of each of the base protrusions 37. As illustrated in FIG. 28, each of the guide protrusions 33 on the circle S6 is arranged so that the first and second side surfaces 33C and 33D are arranged in the tangent direction C (second direction) in contact with the circle S6, the third and fourth side surfaces 33E and 33F are arranged in the radial direction B (first direction) of the circle S6 perpendicular to the tangent direction C of the circle S6, and the bottom surface 33B of the truncated quadrangular pyramid is brought into abutment against the leg plate front surface 36A of each of the base legs 36 and the protrusion plate front surface 37A of each of the base protrusions 37 at the intersection point (contact point) between the cone center line “u” and the circle S6.

The mist piece 31 is formed, for example, in such a manner that the base 32 (base column 34, base ring 35, each of the base legs 36, and each of the base protrusions 37) and each of the guide protrusions 33 are integrated with a synthetic resin.

As illustrated in FIG. 8 to FIG. 14, the mist piece 31 is arranged inside the nozzle tubular portion 15. The mist piece 31 is inserted into the nozzle tubular portion 15 so that each of the guide protrusions 33 (upper surfaces 33A of the truncated quadrangular pyramids) is directed to the back surface 16B of the jet plate 16. The mist piece 31 is inserted into the nozzle tubular portion 15 from each of the guide protrusions 33 (upper surfaces 33A), and is mounted to the nozzle tubular portion 15. In the mist piece 31, each of the guide protrusions 33 and the base 32 are inserted into the nozzle tubular portion 15 from another tube end 15B of the nozzle tubular portion 15.

Figure 9:
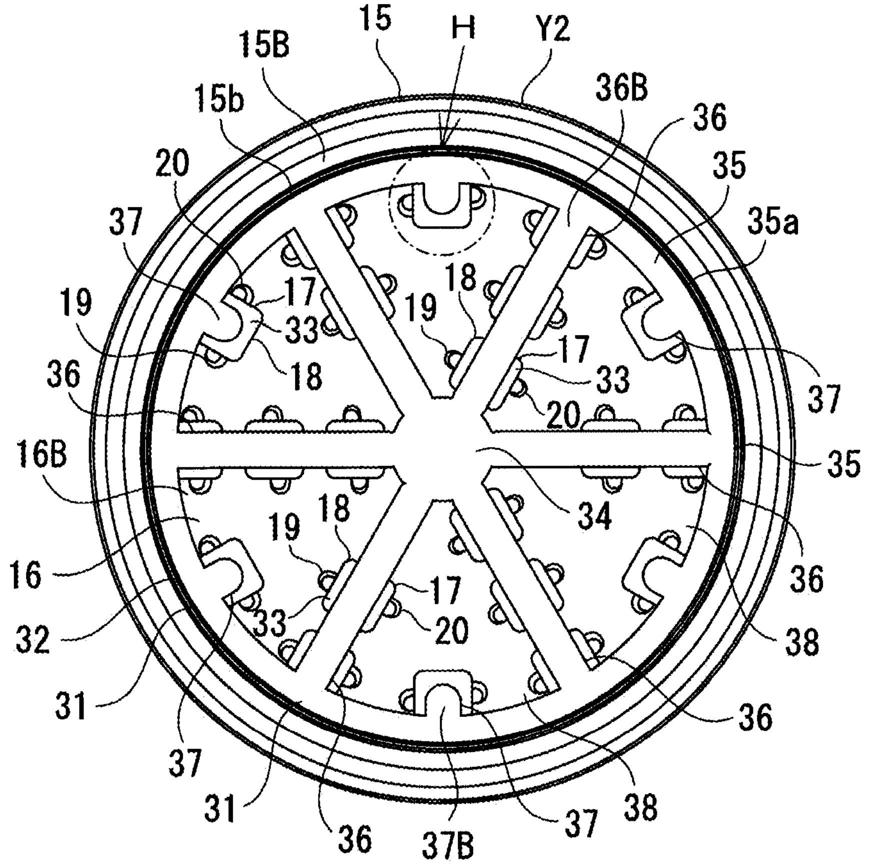
FIG. 9 is a bottom plan view (back surface view) for illustrating the mist generating nozzle according to the second embodiment.
Figure 10:
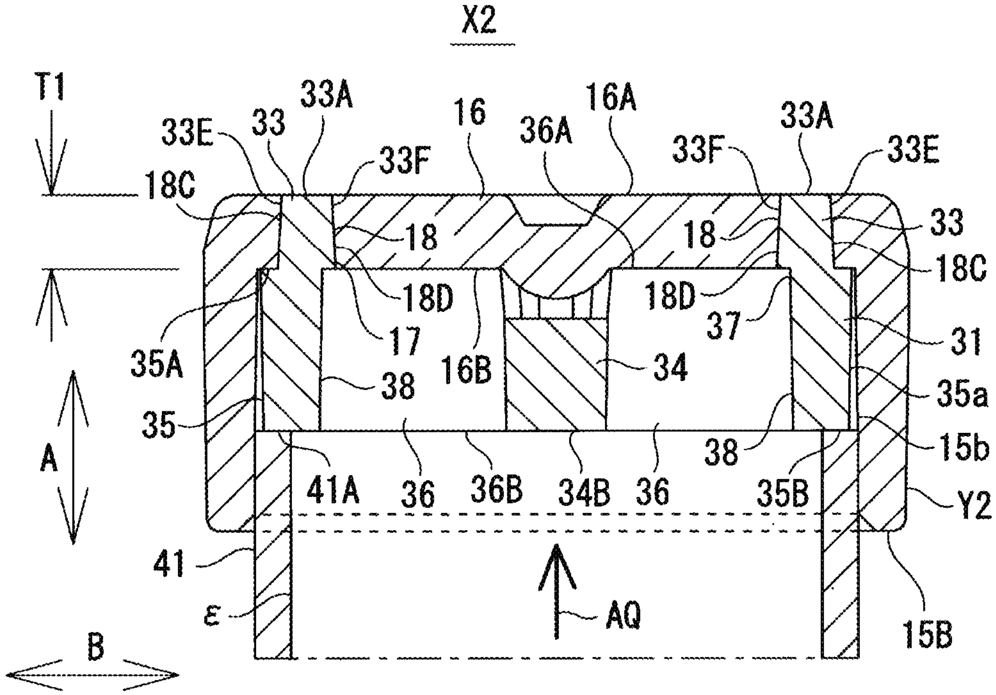
FIG. 10 is a sectional view taken along the line E-E of FIG. 8.

As illustrated in FIG. 9 and FIG. 10, the mist piece 31 is arranged inside the nozzle tubular portion 15 by bringing an outer peripheral surface 35*a* of the base ring 35 into close contact with (causing the outer peripheral surface 35*a* of the base ring 35 to tightly fit to) an inner peripheral surface 15*b* of the nozzle tubular portion 15 and press-fitting each of the guide protrusions 33 into the guide hole 18 of each of the opening hole groups 17 from the back surface 16B of the jet plate 16.

As illustrated in FIG. 8 to FIG. 14, each of the guide protrusions 33 is arranged inside the guide hole 18 of each of the opening hole groups 17 by being press-fitted (inserted) into the guide hole 18 of each of the opening hole groups 17 from the upper surface 33A of the truncated quadrangular pyramid.

Figure 11:
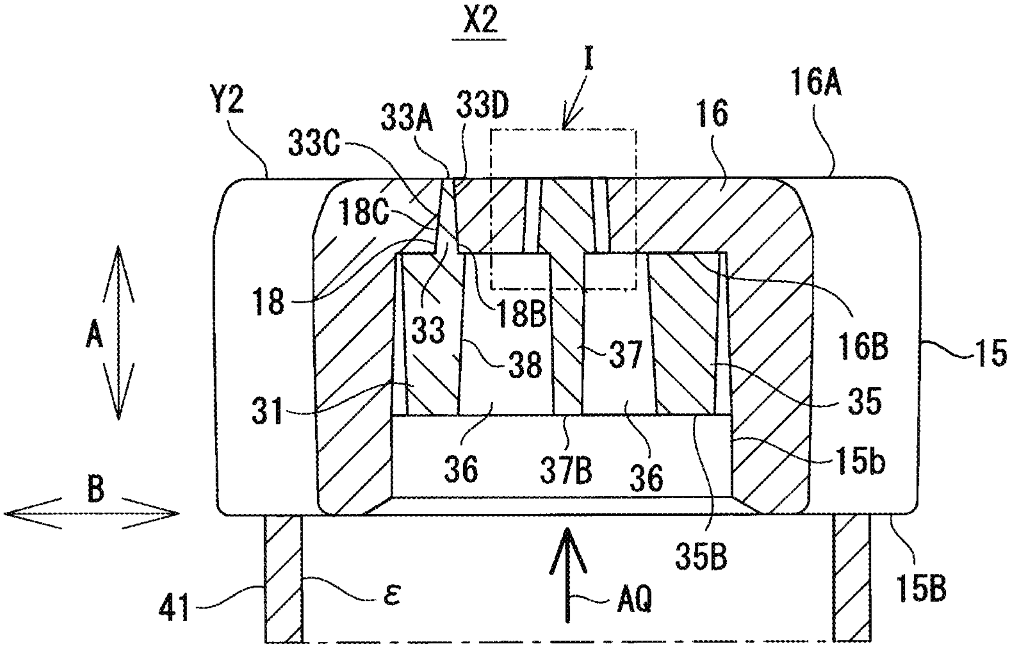
FIG. 11 is a sectional view taken along the line F-F of FIG. 8.
Figure 12A:
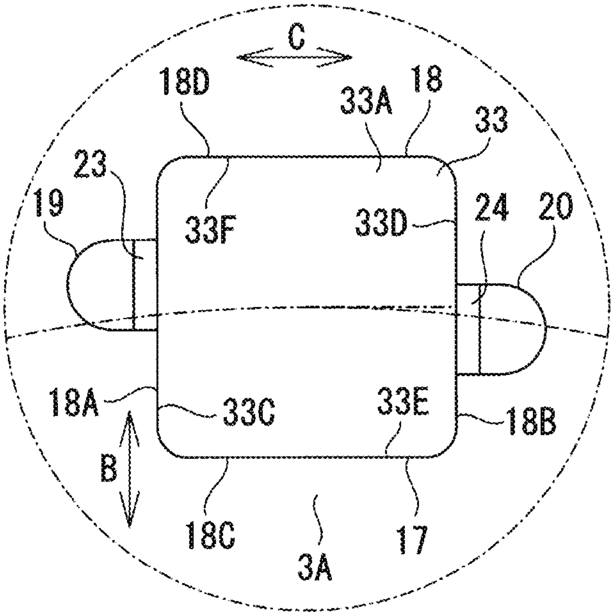
FIG. 12(*a*) is an enlarged view of a G-portion of FIG. 8, and FIG. 12(*b*) is an enlarged view of an H-portion of FIG. 9.
Figure 12B:
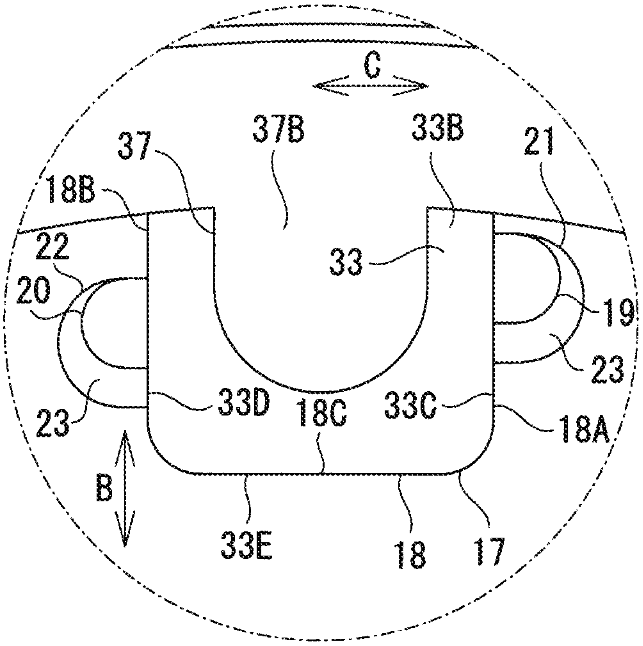

As illustrated in FIG. 11 and FIG. 12, each of the guide protrusions 33 is press-fitted (inserted) into the guide hole 18 of each of the opening hole groups 17 so that the first side surface 33C of the truncated quadrangular pyramid is brought into close contact with (caused to tightly fit to) the first inclined inner side surface 18A of the guide hole 18 of each of the opening hole groups 17, and the second side surface 33D is brought into close contact with (caused to tightly fit to) the second inclined inner side surface 18B of the guide hole 18 of each of the opening hole groups 17.

As illustrated in FIG. 10 and FIG. 12, each of the guide protrusions 33 is press-fitted (inserted) into the guide hole 18 of each of the opening hole groups 17 so that the third side surface 33E of the truncated quadrangular pyramid is brought into close contact with (caused to tightly fit to) the third inclined inner side surface 18C of the guide hole 18 of each of the opening hole groups 17, and the fourth side surface 33F is brought into close contact with (caused to tightly fit to) the fourth inclined inner side surface 18D of the guide hole 18 of each of the opening hole groups 17.

Figure 13:
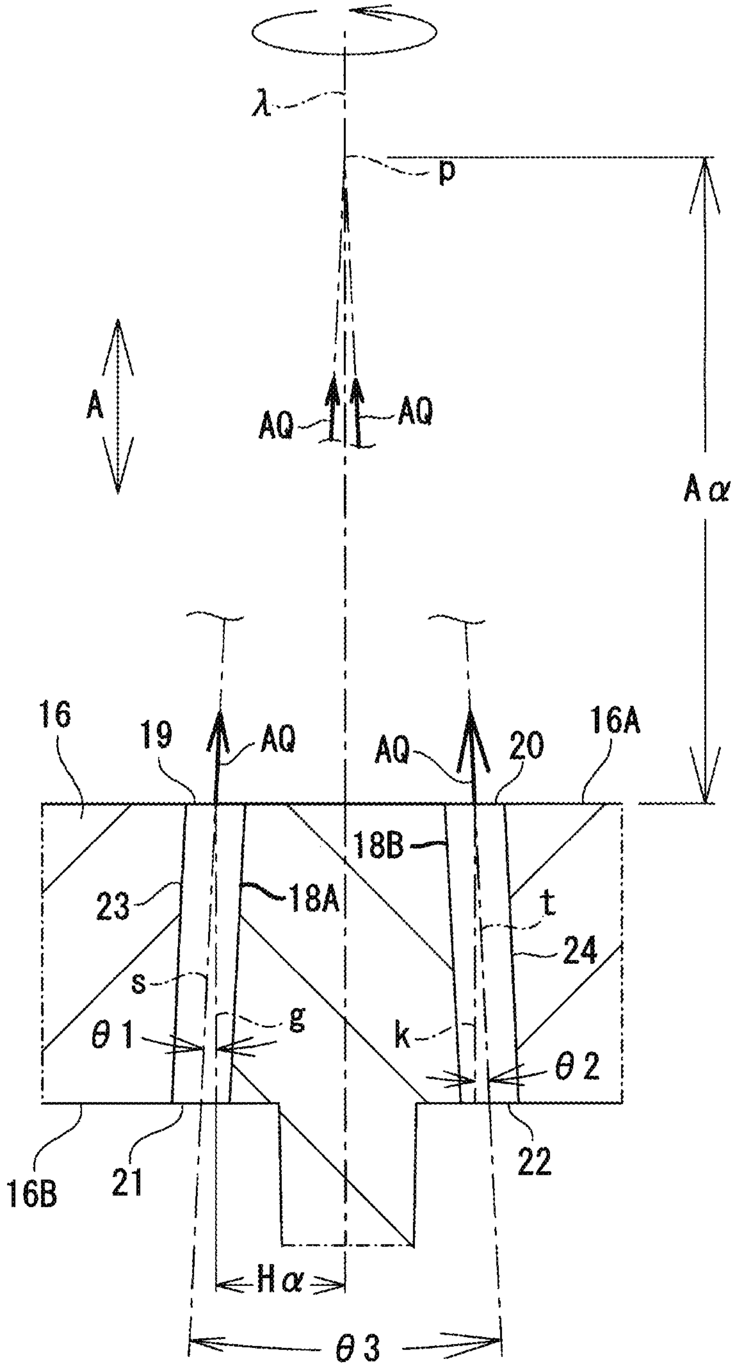
FIG. 13 is a partially enlarged view of FIG. 11.

As illustrated in FIG. 12 and FIG. 13, each of the guide protrusions 33 closes the another port end of the first ejection port 19, the another port end of the first inflow port 21, and the another port end of the first nozzle hole 23 with the first side surface 33C when the first side surface 33C of the truncated quadrangular pyramid is caused to tightly fit to the first inclined inner side surface 18A.

With this configuration, each of the guide protrusions 33 seals and partitions the first ejection port 19, the first inflow port 21, and the first nozzle hole 23 from the guide hole 18 with the first side surface 33C.

As illustrated in FIG. 12 and FIG. 13, each of the guide protrusions 33 closes the another port end of the second ejection port 20, the another port end of the second inflow port 22, and the another port end of the second nozzle hole 24 with the second side surface 33D when the second side surface 33D of the truncated quadrangular pyramid is caused to tightly fit to the second inclined inner side surface 18B.

With this configuration, each of the guide protrusions 33 seals and partitions the second ejection port 20, the second inflow port 22, and the second nozzle hole 24 from the guide hole 18 with the second side surface 33D.

As illustrated in FIG. 10, the mist piece 31 is arranged so that the column end front surface 34A of the base column 34, the tube end front surface 35A of the base ring 35, the leg plate front surface 36A of each of the base legs 36, and the protrusion plate front surface 37A of each of the base protrusions 37 are brought into close contact with (caused to tightly fit to) the back surface 16B of the jet plate 16 inside the nozzle tubular portion 15.

When the mist piece 31 is arranged inside the nozzle tubular portion 15, the first and second inflow ports 21 and 22 of each of the opening hole groups 17 communicate to the inside of the nozzle tubular portion 15 through each of the liquid communication holes 38 as illustrated in FIG. 11 and FIG. 13.

In the mist generating nozzle X2, the nozzle main body Y2 is connected to a liquid flow path pipe 41 (liquid flow path "ε") as illustrated in FIG. 10 and FIG. 11. The liquid flow path pipe 41 is mounted to the nozzle main body Y2 by press-fitting (inserting) one pipe end 41A side of the liquid flow path pipe 41 into the nozzle tubular portion 15 from another tube end 15B of the nozzle tubular portion 15. As illustrated in FIG. 10, FIG. 11, and FIG. 13, the liquid flow path pipe 41 is connected to the first and second inflow ports 21 and 22 through each of the liquid communication holes 38 so that the one pipe end 41A of the liquid flow path pipe 41 is brought into close contact with (caused to tightly fit to) the tube end back surface 35B of the base ring 35 (base 32) inside the nozzle tubular portion 15. As illustrated in FIG. 10 and FIG. 11, the liquid flow path pipe 41 has a liquid flow path "ε". The liquid flow path "ε" is formed inside the liquid flow path pipe 41. The liquid flow path "ε" penetrates through the liquid flow path pipe 41 in a direction of a pipe center line of the liquid flow path pipe 41, and is opened to the one pipe end 41A of the liquid flow path pipe 41. The liquid inflow path "ε" communicates to the first and second inflow ports 21 and 22 of each of the opening hole groups 17 through the one pipe end 41A of the liquid flow path pipe 41 and each of the liquid communication holes 38.

The liquid flow path "ε" (liquid flow path pipe 41) is connected to a liquid supply source (not shown), and a liquid is introduced (supplied) thereto from the liquid supply source. The liquid supply source is, for example, a water supply source that supplies the water AQ to the liquid flow path "ε" (liquid flow path pipe 41). The water AQ (liquid) supplied (introduced) from the water supply source (not shown) flows inside the liquid flow path pipe 41 (liquid flow path "ε") and each of the liquid communication holes 38, and flows into the first and second nozzle holes 23 and 24 of each of the opening hole groups 17 from the first and second inflow ports 21 and 22 of each of the opening hole groups 17.

In the mist generating nozzle X2, the water AQ (liquid) flowing inside the liquid flow path "ε" (liquid flow path pipe 11) flows into the first and second nozzle holes 23 and 24 of each of the opening hole groups 17 from the first and second inflow ports 21 and 22 of each of the opening hole groups 17 through each of the liquid communication holes 38 in the nozzle main body Y2 as illustrated in FIG. 10 and FIG. 11.

Figure 14:
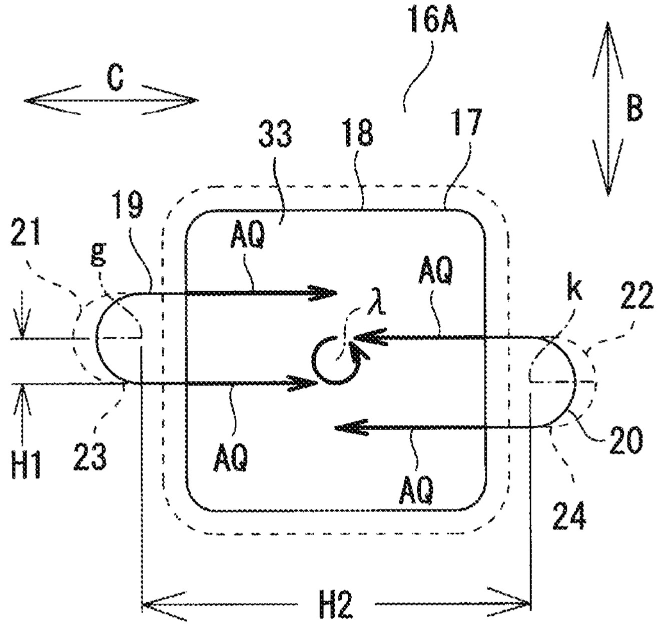
FIG. 14 is a view for illustrating a state of water (liquid) ejected from each of first and second ejection ports in the mist generating nozzle according to the second embodiment.

In the mist generating nozzle X2, the nozzle main body Y2 ejects the water AQ (liquid) having flowed into the first nozzle hole 23 of each of the opening hole groups 17 into outside air from the first ejection port 19 of each of the opening hole groups 17 at the first acute angle θ1 as illustrated in FIG. 13 and FIG. 14. The nozzle main body Y2 ejects the water AQ (liquid) having flowed into the second nozzle hole 24 of each of the opening hole groups 17 into outside air from the second ejection port 20 of each of the opening hole groups 17 at the second acute angle θ2.

As illustrated in FIG. 13 and FIG. 14, the first nozzle hole 23 of each of the opening hole groups 17 ejects the water AQ (liquid) having flowed into the first nozzle hole 23 to the second ejection port 20 side from the first ejection port 19 of each of the opening hole groups 17 at the first acute angle θ1. The first nozzle hole 23 of each of the opening hole groups 17 ejects the water AQ (liquid) toward the second ejection port 20 of each of the opening hole groups 17 in the tangent direction C (second direction) of each of the circles S1, S2, and S3 from the first ejection port 19 of each of the opening hole groups 17 at the first acute angle θ1 (first acute angle with respect to the center line "g" of the first ejection port 19 of each of the opening hole groups 17). The water AQ (liquid) having flowed into the first nozzle hole 23 of each of the opening hole groups 17 flows inside the first nozzle hole 23 of each of the opening hole groups 17 inclined at the first acute angle θ1 with respect to the center line "α" of the first ejection port 19 of each of the opening hole groups 17 to be ejected to the second ejection port 20 side of each of the opening hole groups 17 from the first ejection port 19 of each of the opening hole groups 17 at the first acute angle θ1.

As illustrated in FIG. 13 and FIG. 14, the second nozzle hole 24 of each of the opening hole groups 17 ejects the water AQ (liquid) having flowed into the second nozzle hole 24 to the first ejection port 19 side of each of the opening hole groups 17 from the second ejection port 20 of each of the opening hole groups 17 at the second acute angle θ2. The second nozzle hole 24 of each of the opening hole groups 17 ejects the water AQ (liquid) toward the first ejection port 19 of each of the opening hole groups 17 in the tangent direction C (second direction) of each of the circles S1, S2, and S3 from the second ejection port 20 of each of the opening hole groups 17 at the second acute angle θ2 (second acute angle with respect to the center line "k" of the second ejection port 20 of each of the opening hole groups 17). The water AQ (liquid) having flowed into the second nozzle hole 24 of each of the opening hole groups 17 flows inside the second nozzle hole 24 of each of the opening hole groups 17 inclined at the second acute angle θ2 with respect to the center line "k" of the second ejection port 20 of each of the opening hole groups 17 to be ejected to the first ejection port 19 side of each of the opening hole groups 17 from the second ejection port 20 of each of the opening hole groups 17 at the second acute angle θ2.

As illustrated in FIG. 13, the water AQ (liquid) ejected from the first ejection port 19 of each of the opening hole groups 17 at the first acute angle θ1 and the water AQ (liquid) ejected from the second ejection port 20 of each of the opening hole groups 17 at the second acute angle θ2 intersect with each other at the intersection point "p" between the first and second ejection ports 19 and 20 of each of the opening hole groups 17, which is separated from the front surface 16A of the jet plate 16 at an ejection height Aα (ejection height interval) in the plate thickness direction A (direction perpendicular to the first and second directions B and C), and which is separated from the first ejection port 19 of each of the opening hole groups 17 at an ejection interval Hα in the tangent direction C (second direction) of each of the circles S1, S2, and S3. Parts of the water AQ (liquid) ejected from the first and second ejection ports 19 and 20 of each of the opening hole groups 17 at the first and second acute angles θ1 and θ2 collide with each other at the intersection point "p".

The water AQ (liquid) in a portion in which the first and second ejection ports 19 and 20 of each of the opening hole groups 17 overlap each other (portion in which the first and second ejection ports 19 and 20 of each of the opening hole groups 17 match each other) in the radial direction B (first direction) of each of the circles S1, S2, and S3, which is the water AQ (liquid) ejected from the first and second ejection ports 19 and 20 of each of the opening hole groups 17 at the first and second acute angles θ1 and θ2, is caused to collide at the intersection point "p" as illustrated in FIG. 13.

The ejection height Aα (ejection height interval) is represented by the formula (1), and an ejection interval Hα is represented by the formula (2).

As illustrated in FIG. 13 and FIG. 14, the water AQ (liquid) ejected from the first and second ejection ports 19 and 20 of each of the opening hole groups 17 at the first and second acute angles θ1 and θ2 is turned to be swirled around the turning center line "λ" (turning center) extending in the plate thickness direction A through the intersection point "p" at a center between the first and second ejection ports 19 and 20 of each of the opening hole groups 17 (center of the second hole interval H2) in the tangent direction C (second direction) of each of the circles S1, S2, and S3 by the collision of the parts of the water AQ (parts of the liquid).

The water AQ (liquid) ejected from the first and second ejection ports 19 and 20 of each of the opening hole groups 17 at the first and second acute angles θ1 and θ2 obtains a turning force around the turning center line "λ" due to the collision of the parts of the water AQ (parts of the liquid), to thereby become a turning flow that is swirled around the turning center line "λ" by the turning force as illustrated in FIG. 13 and FIG. 14.

The water AQ (liquid) ejected from the first and second ejection ports 19 and 20 of each of the opening hole groups 17 at the first and second acute angles θ1 and θ2 is pulverized (sheared) by the collision of the parts of the water AQ (parts of the liquid) to become a large amount (large number) of mist (liquid droplets).

The water AQ (liquid) ejected from the first and second ejection ports 19 and 20 of each of the opening hole groups 17 at the first and second acute angles θ1 and θ2 and air bubbles (air/gas) in the water AQ (in the liquid) are pulverized (sheared) by the collision (splash) of the parts of the water AQ (parts of the liquid) and the turning (turning flow), to thereby become a large amount (large number) of mist water (water droplets/liquid droplets) in which a large amount (large number) of microbubbles and a large amount (large number) of ultrafine bubbles are mixed and dissolved.

The water AQ (liquid) ejected from the first and second ejection ports 19 and 20 of each of the opening hole groups 17 at the first and second acute angles θ1 and θ2 is turned while sucking (mixing) air (outside air) into the mist water (water droplets/liquid droplets) by the turning (turning flow). The mist water (liquid droplets) and the air bubbles (containing air sucked in the mist water by the turning flow) in the mist water (water droplets/liquid droplets) are pulverized (sheared) by the turning flow (turning), to thereby become a large amount (large number) of mist water (water droplets/liquid droplets) in which a large amount (large number) of microbubbles and a large amount (large number) of ultrafine bubbles are mixed and dissolved.

In the mist generating nozzle X2, the first and second ejection ports 19 and 20 of each of the opening hole groups 17 are opened to the front surface 16A of the jet plate 16 without communicating to each other, the first and second hole intervals H1 and H2 are set to such intervals as to allow the parts of the water AQ (liquid) ejected from the first and second ejection ports 19 and 20 of each of the opening hole groups 17 at the first and second acute angles θ1 and θ2 to collide with each other, and the first and second nozzle holes 23 and 24 of each of the opening hole groups 17 are inclined at the first and second acute angles θ1 and θ2. With this configuration, the parts of the water AQ (liquid) ejected from the first and second ejection ports 19 and 20 of each of the opening hole groups 17 are caused to collide (splash), and the water AQ (liquid) ejected from the first and second ejection ports 19 and 20 of each of the opening hole groups 17 can be turned. As a result, a large amount (large number) of mist water (water droplets/liquid droplets) in which a large amount (large number) of microbubbles and a large amount (large number) of ultrafine bubbles are mixed and dissolved can be generated (produced) by the collision of the water AQ (liquid) and the turning of the water AQ. In the mist generating nozzle X2, a large amount (large number) of mist water (water droplets/liquid droplets) in which a large amount (large number) of microbubbles and a large amount (large number) of ultrafine bubbles are mixed and dissolved can be generated (produced) merely by ejecting the water AQ (liquid) into outside air from the first and second ejection ports 19 and 20. The first hole interval H1 and the first hole interval H2 are set to such intervals (intervals enabling collision) as to allow the water AQ (liquid) ejected from the first ejection port 19 of each of the opening hole groups 17 at the first acute angle θ1 and the water AQ (liquid) ejected from the second ejection port 20 of each of the opening hole groups 17 at the second acute angle θ2 to collide with each other.

INDUSTRIAL APPLICABILITY

The present invention is most suitable for generating a large amount (large number) of mist water (water droplets/liquid droplets) in which a large amount (large number) of microbubbles and a large amount (large number) of ultrafine bubbles are mixed and dissolved.

REFERENCE SIGNS LIST

X1 mist generating nozzle
Y1 nozzle main body (nozzle means)
2 nozzle tubular portion
3 jet plate (ejection plate/nozzle plate)
4 first ejection port
5 second ejection port
6 first inflow port
7 second inflow port
8 first nozzle hole
9 second nozzle hole
11 liquid flow path pipe
A plate thickness direction
B first direction
C second direction
H1 first hole interval
H2 second hole interval
H3 third hole interval
H4 fourth hole interval
α center line of first ejection port
β center line of second ejection port
γ center line of first inflow port
τ center line of second inflow port
σ hole center line of first nozzle hole
δ hole center line of second nozzle hole
ε liquid flow path
θ1 first acute angle
θ2 second acute angle
θ3 hole-to-hole angle
AQ water (liquid)

The invention claimed is:

1. A mist generating nozzle, comprising a nozzle main body including: a jet plate; a guide hole penetrating through the jet plate and being opened to a front surface and a back surface of the jet plate; a first ejection port opened to the front surface of the jet plate; a second ejection port opened to the front surface of the jet plate; a first inflow port opened to the back surface of the jet plate; a second inflow port opened to the back surface of the jet plate; a first nozzle hole; a second nozzle hole; and a guide protrusion formed in a truncated quadrangular pyramid shape having an upper surface, a bottom surface, and first to fourth inclined side surfaces, wherein the guide hole is formed in a truncated quadrangular pyramid shape having first and second inclined inner side surfaces in a second direction perpendicular to a first direction, and having third and fourth inclined inner side surfaces in the first direction, wherein the first inclined inner side surface is arranged between the front surface and the back surface of the jet plate at a first acute angle between the first inclined inner side surface and a guide hole center line of the guide hole in the second direction, wherein the second inclined inner side surface is arranged between the front surface and the back surface of the jet plate at a second acute angle between the second inclined inner side surface and the guide hole center line of the guide hole in the second direction, wherein the first ejection port and the second ejection port are arranged at a first hole interval between a center line of the first ejection port and a center line of the second ejection port in the first direction, wherein the first ejection port is arranged at the second hole interval H2 from the second ejection port so that the guide hole is located between the first ejection port and the second ejection port in the second direction, wherein the first ejection port extend in the second direction, and is opened to the guide hole, wherein the second ejection port extend in the second direction, and is opened to the guide hole, wherein the first inflow port and the second inflow port are arranged at the first hole interval between a center line of the first inflow port and a center line of the second inflow port in the first direction, wherein the first inflow port is arranged so that the guide hole is located between the first inflow port and the second ejection port in the second direction, wherein the first inflow port is arranged at a third hole interval between the center line of the first inflow port and the center line of the first ejection port in the second direction, wherein the first inflow port extends in the second direction, and is opened to the guide hole, wherein the second inflow port is arranged so that the guide hole is located between the second inflow port and the first ejection port in the second direction, wherein the second inflow port is arranged at a fourth hole interval between the center line of the second inflow port and the center line of the second ejection port in the second direction, wherein the second inflow port extends in the second direction, and is opened to the guide hole, wherein the first nozzle hole extends between the first ejection port and the first inflow port at the first acute angle between a hole center line of the first nozzle hole and the center line of the first ejection port in the second direction, and is connected to the first ejection port and the first inflow port, wherein the first nozzle hole is arranged so as to extend in the second direction and to be opened to the first inclined inner side surface, wherein the second nozzle hole extends between the second ejection port and the second inflow port at the second acute angle between a hole center line of the second nozzle hole and the center line of the second ejection port in the second direction, and is connected to the second ejection port and the second inflow port, wherein the second nozzle hole is arranged so as to extend in the second direction and to be opened to the second inclined inner side surface, wherein the first nozzle hole and the second nozzle hole are arranged at a hole-to-hole angle of more than 0 degrees and 90 degrees or less between the hole center line of the first nozzle hole and the hole center line of the second nozzle hole in the second direction, wherein the guide protrusion is inserted into the guide hole from the upper surface of the truncated quadrangular pyramid so that the first inclined side surface is brought into close contact with the first inclined inner side surface of the guide hole, and seals the first ejection port, the first inflow port, and the first nozzle hole from the guide hole, wherein the guide protrusion is inserted into the guide hole so that the second inclined side surface is brought into close contact with the second inclined inner side surface of the guide hole, and seals the second ejection port, the second inflow port, and the second nozzle hole from the guide hole, wherein the guide protrusion is inserted into the guide hole so that the third inclined side surface is brought into close contact with the third inclined inner side surface of the guide hole, wherein the guide protrusion is inserted into the guide hole so that the fourth inclined side surface is brought into close contact with the fourth inclined inner side surface of the guide hole, wherein the nozzle main body is connected to a liquid flow path, and a liquid flowing through the liquid flow path flows into the first and second nozzle holes from the first and second inflow ports, wherein the nozzle main body ejects the liquid having flowed into the first nozzle hole from the first ejection port at the first acute angle and ejects the liquid having flowed into the second nozzle hole from the second ejection port at the second acute angle, and wherein the first hole interval and the second hole interval are set to such intervals as to allow a part of the liquid ejected from the first ejection port at the first acute angle and a part of the liquid ejected from the second ejection port at the second acute angle to collide with each other.

* * * * *